United States Patent
Wang et al.

(10) Patent No.: US 12,462,347 B2
(45) Date of Patent: Nov. 4, 2025

(54) GENERATION OF IMAGE DENOISING TRAINING DATA VIA PHOTON-COUNT SPLITTING

(71) Applicants: GE Precision Healthcare LLC, Wauwatosa, WI (US); The Board of Trustees of the Leland Stanford Junior University, Stanford, CA (US)

(72) Inventors: Sen Wang, Stanford, CA (US); Yirong Yang, Stanford, CA (US); Zhye Yin, Niskayuna, NY (US); Adam S. Wang, Palo Alto, CA (US)

(73) Assignees: GE Precision Healthcare LLC, Waukesha, WI (US); The Board of Trustees of the Leland Stanford Junior University, Stanford, CA (US)

( * ) Notice: Subject to any disclaimer, the term of this patent is extended or adjusted under 35 U.S.C. 154(b) by 470 days.

(21) Appl. No.: 18/050,111

(22) Filed: Oct. 27, 2022

(65) Prior Publication Data

US 2024/0144442 A1 May 2, 2024

(51) Int. Cl.
*G06T 5/00* (2024.01)
*A61B 6/00* (2006.01)
(Continued)

(52) U.S. Cl.
CPC ............... *G06T 5/70* (2024.01); *A61B 6/4241* (2013.01); *A61B 6/5258* (2013.01);
(Continued)

(58) Field of Classification Search
CPC ............ G06T 5/70; G06T 2207/10081; G06T 2207/20081; G06T 2207/20084;
(Continued)

(56) References Cited

U.S. PATENT DOCUMENTS

2019/0104940 A1* 4/2019 Zhou ..................... G06T 11/008
2019/0108904 A1* 4/2019 Zhou ..................... G16H 30/20
(Continued)

FOREIGN PATENT DOCUMENTS

JP 2021146220 A 9/2021

OTHER PUBLICATIONS

Lehtinen, J. et al. | "Noise2noise: Learning image restoration without clean data." arXiv:1803.04189v3 [cs.CV] Oct. 29, 2018, 12 pages.
(Continued)

*Primary Examiner* — Van D Huynh
(74) *Attorney, Agent, or Firm* — Amin, Turocy & Watson, LLP

(57) ABSTRACT

Systems/techniques that facilitate generation of image denoising training data via photon-count splitting are provided. In various embodiments, a system can access a set of sinograms generated by a photon-counting computed tomography scanner. In various aspects, the system can split the set of sinograms into a first reduced-photon-count set of sinograms and a second reduced-photon-count set of sinograms. In various instances, the system can convert, via image reconstruction, the first reduced-photon-count set of sinograms into at least one training input image and the second reduced-photon-count set of sinograms into at least one training output image. In various cases, the system can train a deep learning neural network based on the at least one training input image and the at least one training output image.

20 Claims, 16 Drawing Sheets

(51) Int. Cl.
   *A61B 6/42* (2024.01)
   *G06T 5/70* (2024.01)

(52) U.S. Cl.
   CPC ............. *G06T 2207/10081* (2013.01); *G06T 2207/20081* (2013.01); *G06T 2207/20084* (2013.01)

(58) Field of Classification Search
   CPC ......... G06T 2211/408; G06T 2211/441; G06T 11/005; G06T 7/10; A61B 6/4241; A61B 6/5258; G06N 3/04; G06N 3/09
   See application file for complete search history.

(56) References Cited

U.S. PATENT DOCUMENTS

| | | | | |
|---|---|---|---|---|
| 2020/0311490 | A1* | 10/2020 | Lee | G06T 5/60 |
| 2020/0311878 | A1* | 10/2020 | Matsuura | G06V 10/82 |
| 2020/0402644 | A1* | 12/2020 | Zhou | G06V 30/244 |
| 2021/0012541 | A1* | 1/2021 | Lee | G06N 3/08 |
| 2021/0290191 | A1* | 9/2021 | Qi | A61B 6/5258 |
| 2023/0119427 | A1* | 4/2023 | Zhou | G06T 11/008 382/156 |
| 2023/0360794 | A1* | 11/2023 | Lyu | G16H 50/20 |
| 2024/0185485 | A1* | 6/2024 | Salomon | G06T 11/006 |

OTHER PUBLICATIONS

Yuan, N. et al. | "Half2Half: deep neural network based CT image denoising without independent reference data." Physics in Medicine & Biology. 2020; 65(21):215020, published Nov. 4, 2020, 17 pages.
Wu, D. et al. | "Consensus neural network for medical imaging denoising with only noisy training samples." arXiv:1906.03639v1 [eess.IV] Jun. 9, 2019, 9 pages.
Wu D, et al. | "Low-dose CT reconstruction with Noise2Noise network and testing-time fine-tuning." Med Phys. 2021;48(12):7657-7672, doi: 10.1002/mp.15101. Epub Nov. 17, 2021, 16 pages.
Wang S. et al. | "Simulating Arbitrary Dose Levels and Independent Noise Image Pairs from a Single CT Scan." In: 7th International Meeting on Image Formation in X-Ray Computed Tomography. 1230423 (Oct. 17, 2022); doi: 10.1117/12.2646411, 8 pages.
Rajagopal, J.R. et al. | "Comparison of low dose performance of photon-counting and energy integrating CT." Acad Radiol. 2021;28(12):1754-1760, 7 pages.
Heller, N. et al. | "The state of the art in kidney and kidney tumor segmentation in contrast-enhanced CT imaging: Results of the KiTS19 challenge." Med Image Anal. Jan. 2021; 67:101821. doi:10.1016/j.media.2020.101821, 39 pages.
Wang, A. et al. | "Acuros CTS: A fast, linear Boltzmann transport equation solver for computed tomography scatter—Part II: System modeling, scatter correction, and optimization." Med Phys. 45(5), May 2018, 1914-1925, 13 pages.
Persson, M. et al. | "Detective quantum efficiency of photon-counting CdTe and Si detectors for computed tomography: a simulation study." J Med Imaging (Bellingham). Jul. 2020; 7(4): 043501, published online Jul. 17, 2020, doi: 10.1117/1.JMI.7.4.043501, 28 pages.
EP application 23206001.2 filed Oct. 26, 2023—extended Search Report issued Apr. 23, 2024; 10 pages.
Mechlem Korbinian et al: "Spectral Angiography Material Decomposition Using an Empirical Forward Model and a Dictionary-Based Regularization", IEEE Transactions on Medical Imaging, vol. 37, No. 10, Oct. 1, 2018, pp. 2298-2309.
Nadkarni Rohan et al: "Material decomposition from photon-counting CT using a convolutional neural network and energy-integrating CT training labels", Proceedings of the SPIE, SPIE, US, vol. 12304, Oct. 18, 2022, pp. 123041 K-123041 K.
Wang Adam S et al: "Spectral Photon Counting CT: Imaging Algorithms and Performance Assessment", IEEE Transactions on Radiation and Plasma Medical Sciences, IEEE, vol. 5, No. 4, Jul. 7, 2020, pp. 453-464.
JP application 2023-136375 filed Aug. 24, 2023—Office Action issued Nov. 6, 2024; Machine Translation; 6 pages.
JP JP2021-146220A English Abstract; obtained from Espacenet.com Feb. 6, 2025; 1 page.

\* cited by examiner

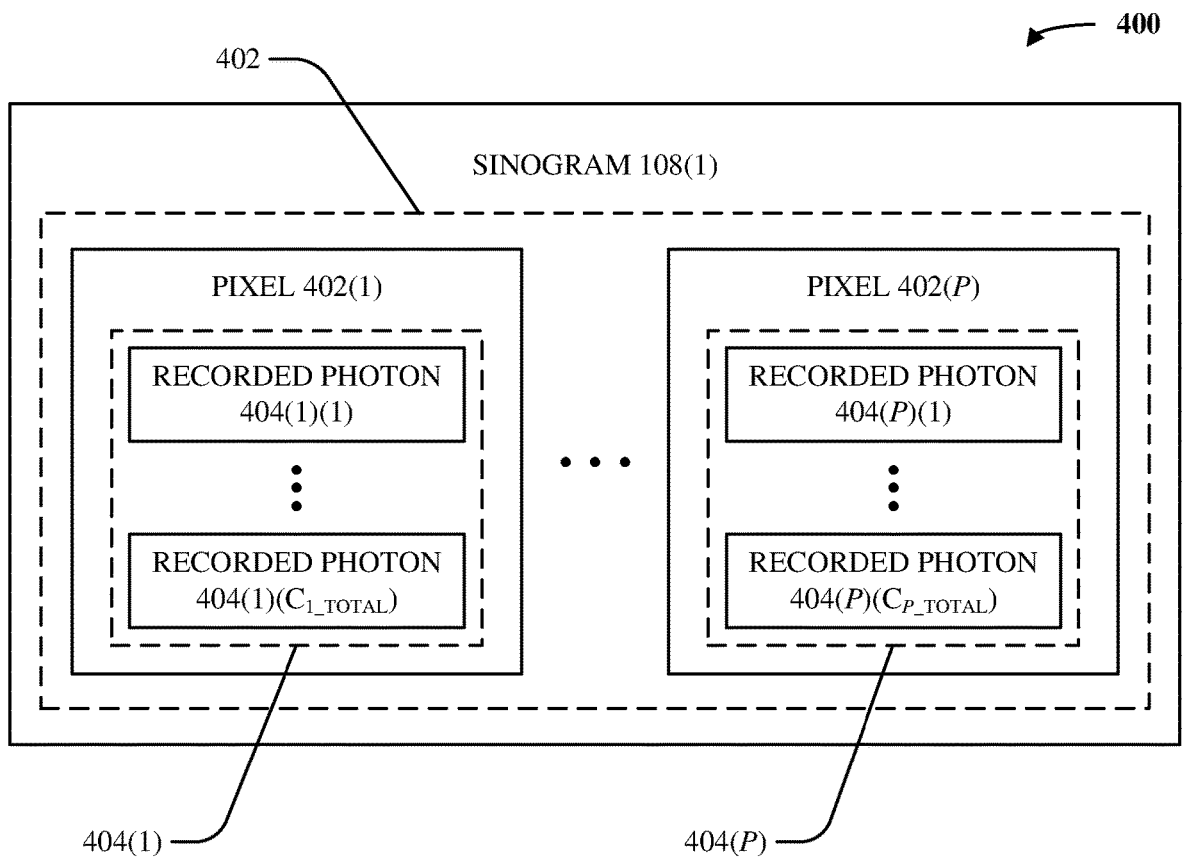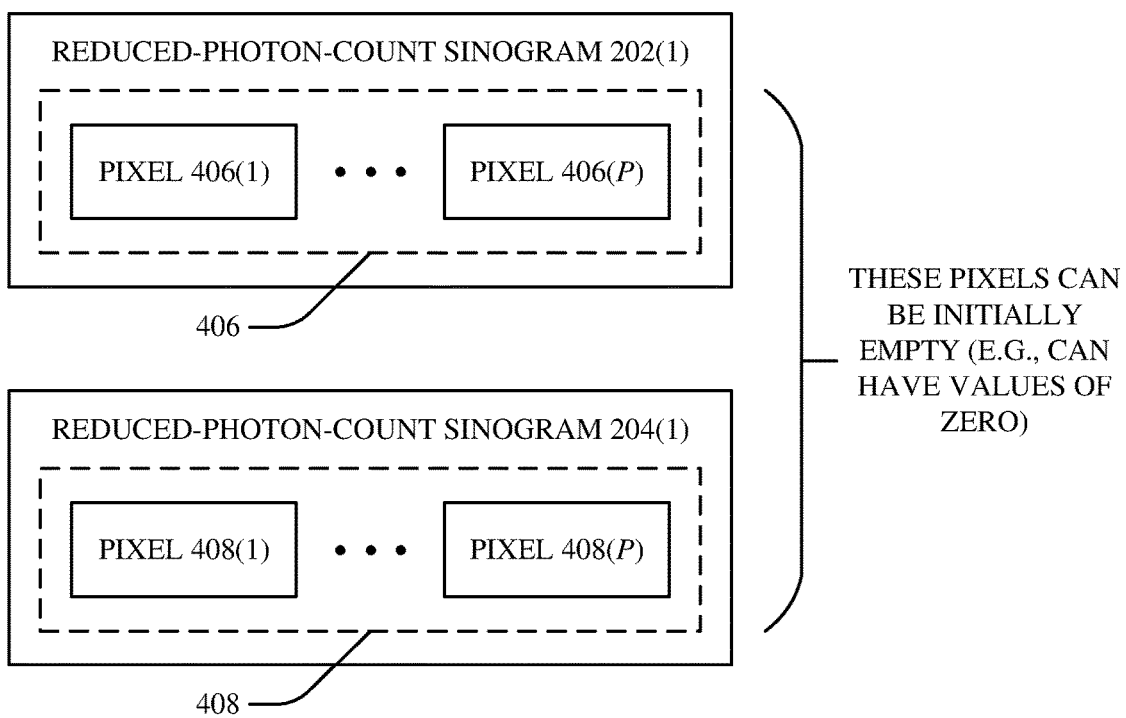
FIG. 4

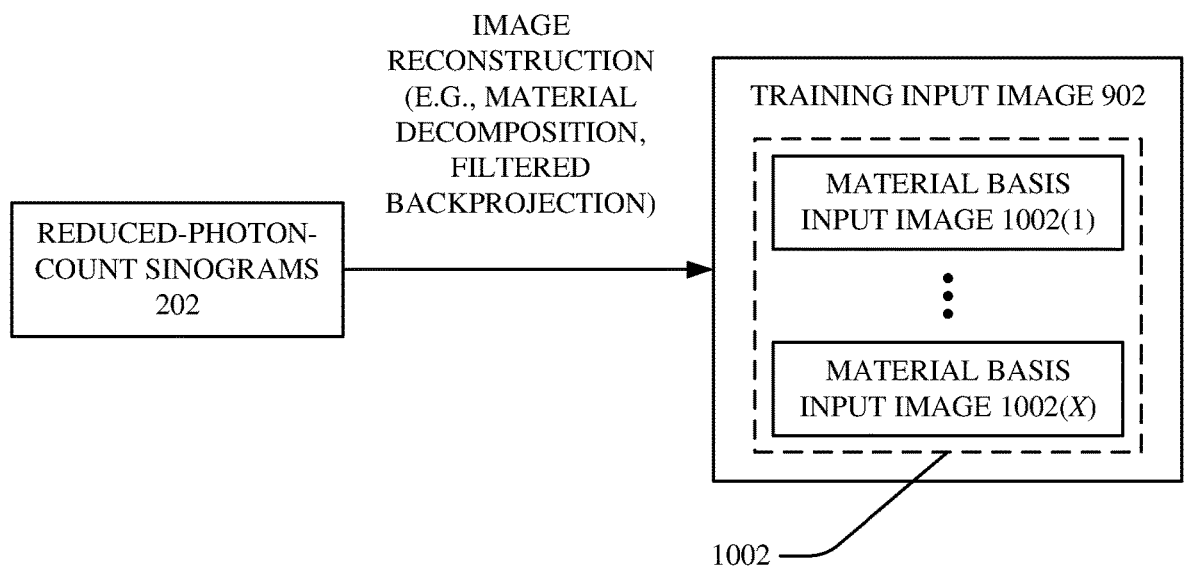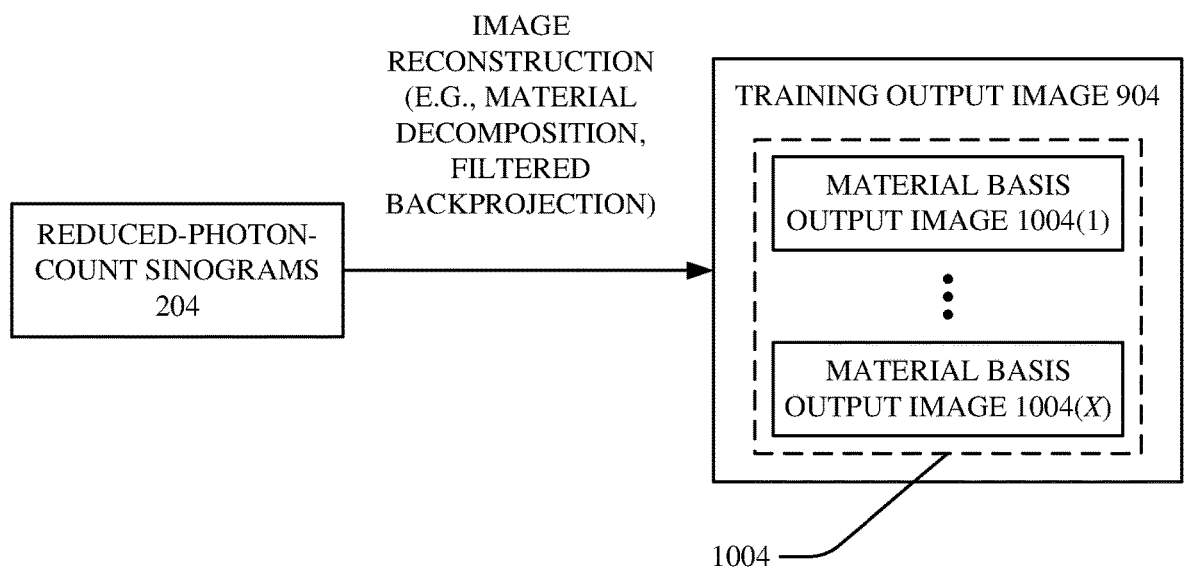
FIG. 10

GENERATION OF IMAGE DENOISING TRAINING DATA VIA PHOTON-COUNT SPLITTING

TECHNICAL FIELD

The subject disclosure relates generally to image denoising, and more specifically to generation of image denoising training data via photon-count splitting.

BACKGROUND

A deep learning neural network can be trained in supervised fashion to perform denoising on inputted computed tomography images. Unfortunately, obtaining an annotated training dataset on which to train the deep learning neural network can be challenging.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate generation of image denoising training data via photon-count splitting are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a set of sinograms generated by a photon-counting computed tomography scanner. In various aspects, the computer-executable components can comprise a split component that can split the set of sinograms into a first reduced-photon-count set of sinograms and a second reduced-photon-count set of sinograms. In various instances, the computer-executable components can comprise a reconstruction component that can convert, via image reconstruction, the first reduced-photon-count set of sinograms into at least one training input image and the second reduced-photon-count set of sinograms into at least one training output image. In various cases, the computer-executable components can comprise a training component that can train a deep learning neural network based on the at least one training input image and the at least one training output image.

According to one or more embodiments, the above-described system can be implemented as a computer-implemented method or a computer program product.

DESCRIPTION OF THE DRAWINGS

FIGS. 3-7 illustrate example, non-limiting block diagrams showing how various sets of reduced-photon-count sinograms can be generated in accordance with one or more embodiments described herein.

FIG. 10 illustrates an example, non-limiting block diagram showing how training input images and training output images can be generated based on various sets of reduced-photon-count sinograms in accordance with one or more embodiments described herein.

DETAILED DESCRIPTION

Figure 1:
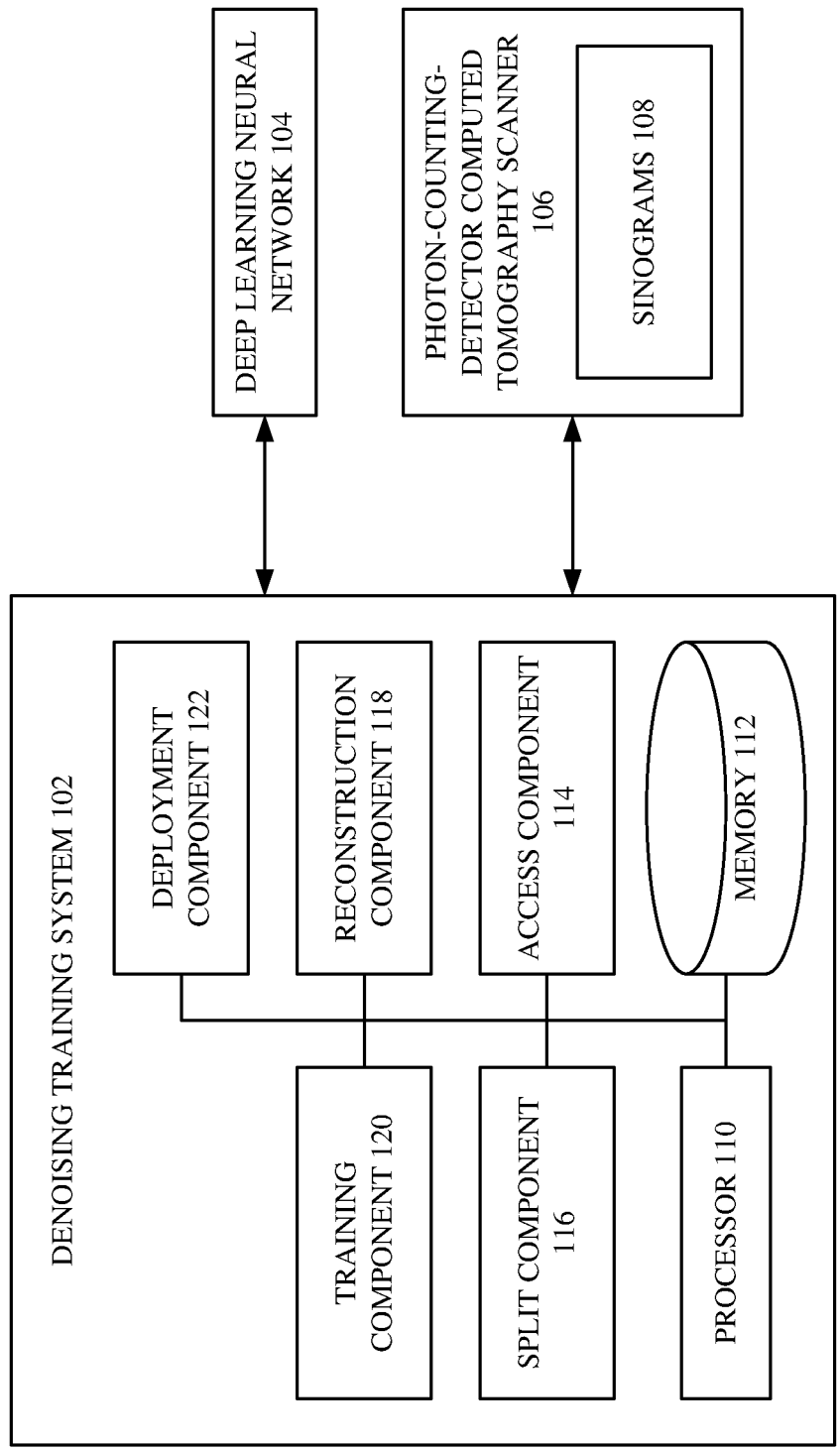
FIG. 1 illustrates a block diagram of an example, non-limiting system that facilitates generation of image denoising training data via photon-count splitting in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A deep learning neural network can be trained in supervised fashion to perform denoising on inputted computed tomography (CT) images. Unfortunately, obtaining or otherwise curating an annotated training dataset on which to train the deep learning neural network can be challenging for various reasons.

With respect to image denoising of CT images, an annotated training dataset can include a set of training CT image pairs, with each training CT image pair including a training input CT image that exhibits some amount of visual noise and a respectively corresponding training output CT image that exhibits a lower amount of visual noise. In various cases, the training input CT image can depict any suitable anatomical structures of a medical patient, and the training output CT image can depict the same anatomical structures of the same medical patient but with less visual noise. Accordingly, the training output CT image can be considered as a ground-truth denoised or reduced-noise version (e.g., target) of the training input CT image. Various techniques exist by which to obtain the training input CT image and the training output CT image.

To achieve theoretically optimal denoising performance, the training output CT image would be a completely noiseless (e.g., clean) version of the training input CT image. However, it is not practical to obtain such completely noiseless CT images in clinical settings. After all, the amount of visual noise present in a CT scanned image can vary inversely with the radiation dosage of that CT scanned image. Accordingly, obtaining a completely noiseless CT scanned image in a clinical setting would require an infinite amount of radiation dosage, which is not realistic. In other words, any CT scanned image that is generated in a clinical setting with less than an infinite amount of radiation dosage would have at least some visual noise. Although noiseless CT images can be approximated in strict laboratory/experimental settings, such approximation utilizes complicated or computationally intensive techniques that cannot feasibly or practicably be implemented at scale in clinical settings.

When some existing techniques are implemented, the training input CT image is obtained by performing a low-dose CT scan on the medical patient, and the training output CT image is obtained by performing a high-dose CT scan on the medical patient. Because the training output CT image can be generated using a larger radiation dosage than the training input CT image, the training output CT image can exhibit less visual noise than the training input CT image, and so the training input CT image and the training output CT image can be used for image denoising training. However, such existing techniques have their own disadvantages. In particular, such existing techniques involve repeat scans. In other words, because such existing techniques require two separate scans to be performed on the medical patient (e.g., one scan for the training input CT image, and another scan for the training output CT image), such existing techniques can expose the medical patient to excessive amounts of radiation, which can increase the likelihood of the medical patient experiencing negative health consequences. Moreover, such existing techniques often suffer from registration problems. That is, because such existing techniques require two separate scans to be performed on the medical patient, it can often be the case that the training input CT image and the training output CT image become misregistered or misaligned with each other (e.g., due to the medical patient being in a slightly different bodily position or bodily orientation during the second CT scan as compared to the first CT scan). Such misregistration can adversely affect subsequent denoising training.

When other existing techniques are implemented, the training output CT image is obtained by performing a high-dose CT scan on the medical patient, and the training input CT image is obtained by copying the training output CT image and inserting noise into that copy. In such case, the training output CT image can exhibit less visual noise than the training input CT image, and so the training input CT image and the training output CT image can be used for image denoising training. Such techniques do not involve repeat scans, and thus they can avoid the problems of excess radiation exposure and misregistration. However, just as above, such existing techniques have their own disadvantages. Specifically, because the training output CT image can be generated with less than an infinite radiation dosage, there can be some non-zero amount of noise present in the training output CT image. Moreover, because the training input CT image can be based on a copy of the training output CT image, the training input CT image can also have that same non-zero amount of noise. In other words, such non-zero amount of noise can be considered as being correlated between the training input CT image and the training output CT image. In still other words, the noise present in the training input CT image can be considered as not being independent of the noise present in the training output CT image. So, when the training input CT image is generated via injection of additional noise, a deep learning neural network that is trained using the training input CT image can learn only how to remove the additional, injected noise; the deep learning neural network cannot learn how to remove the non-zero amount of noise that is present (e.g., correlated) in both the training input CT image and the training output CT image.

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate generation of image denoising training data via photon-count splitting. In other words, the inventors of various embodiments described herein recognized that various disadvantages of existing techniques for generating image denoising training data can be ameliorated by implementation of photon-count splitting. In particular, a photon-counting-detector computed tomography (PCD-CT) scanner (as opposed to an energy-integrating-detector computed tomography (EID-CT) scanner) can perform a scan on a medical patient, thereby yielding a set of sinograms. In various aspects, as described herein, the set of sinograms can be split, via photon-wise binomial selection, into a first set of reduced-photon-count sinograms and a second set of reduced-photon-count sinograms. In various instances, as further described herein, the first set of reduced-photon-count sinograms can be converted, via any suitable image reconstruction techniques, into a training input CT image. Likewise, as further described herein, the second set of reduced-photon-count sinograms can be converted, via any suitable image reconstruction techniques, into a training output CT image. Note that such pair of training images can be generated by scanning the medical patient once. That is, repeat scans and their concomitant problems (e.g., misregistration, excessive radiation exposure) can be avoided. Moreover, as described herein, the implementation of photon-count splitting via photon-wise binomial selection can cause visual noise present in the training input CT image to be independent of (e.g., to be not correlated with) visual noise present in the training output CT image. Accordingly, the problem of correlated noise can be avoided, which can lead to improved denoising training. Indeed, the present inventors experimentally verified that various embodiments described herein can achieve denoising performance comparable to techniques that utilize completely clean (e.g., noiseless) training output images.

Various embodiments described herein can be considered as a computerized tool (e.g., any suitable combination of computer-executable hardware or computer-executable software) that can facilitate generation of image denoising training data via photon-count splitting. In various aspects, such computerized tool can comprise an access component, a split component, a reconstruction component, a training component, or a deployment component.

In various embodiments, a PCD-CT scanner (not an EID-CT scanner) can perform a scan on a medical patient, thereby yielding a set of sinograms. In various aspects, the set of sinograms can include any suitable number of sinograms. In various instances, a sinogram can be a two-dimensional pixel array that represents projection data captured by the PCD-CT scanner. For example, one dimension of a sinogram can represent or span gantry angle of the PCD-CT scanner, while the other dimension of the sinogram can represent or span distance along a projection direction of the PCD-CT scanner (e.g., distance in a direction orthogonal to a direction of X-ray emission). In various cases, because the set of sinograms can be generated by the PCD-CT scanner (rather than an EID-CT scanner), the pixels of the set of sinograms can represent photon-counts collated by photon energy bins. In other words, a given sinogram in the set of sinograms can correspond to a given photon energy range, a given pixel of that given sinogram can be considered as corresponding to a given angle-distance tuple that was swept during the scan of the medical patient, and the value of that given pixel can be considered as representing how many individual photons within the given photon energy range were detected by the PCD-CT scanner at that given angle-distance tuple.

In various embodiments, the access component of the computerized tool can electronically receive or otherwise electronically access the set of sinograms. In some aspects, the access component can electronically retrieve the set of sinograms from any suitable centralized or decentralized data structures (e.g., graph data structures, relational data structures, hybrid data structures), whether remote from or local to the access component. In other aspects, the access component can electronically retrieve the set of sinograms from the PCD-CT scanner that generated the set of sinograms. In any case, the access component can electronically obtain or access the set of sinograms, such that other components of the computerized tool can electronically interact with (e.g., read, write, edit, copy, manipulate) the set of sinograms.

In various embodiments, the split component of the computerized tool can electronically split, via photon-wise binomial selection, the set of sinograms into a first set of reduced-photon-count sinograms and a second set of reduced-photon-count sinograms. More specifically, the first set of reduced-photon-count sinograms and the second set of reduced-photon-count sinograms can be initially empty sets. In various instances, the split component can iterate through each of the set of sinograms. For any given sinogram from the set of sinograms, the split component can insert into the first set of reduced-photon-count sinograms an empty sinogram that has the same dimensionality as the given sinogram (e.g., the empty sinogram can have the same number or arrangement of pixels as the given sinogram, but the pixel values of the empty sinogram can all be zero initially). For ease of explanation, such empty sinogram can be referred to as sinogram A. Similarly, the split component can insert into the second set of reduced-photon-count sinograms an empty sinogram that has the same dimensionality as the given sinogram (e.g., the empty sinogram can have the same number or arrangement of pixels as the given sinogram, but the pixel values of the empty sinogram can all be zero initially). For ease of explanation, such empty sinogram can be referred to as sinogram B.

Now, as mentioned above, each pixel of the given sinogram can represent a photon-count. In other words, each pixel of the given sinogram can be considered as containing or otherwise representing a respective number of recorded photons. Accordingly, in various aspects, the split component can iterate through each pixel of the given sinogram, and, for any given pixel of the given sinogram, the split component can iterate through the recorded photons that are represented by that given pixel. For any given recorded photon, the split component can assign that given recorded photon to a respective pixel in the sinogram A or instead to a respective pixel in the sinogram B, via binomial selection. In particular, the split component can probabilistically assign, according to any suitable threshold probability, that given recorded photon to the respective pixel in the sinogram A, or the split component can instead probabilistically assign, according to a complement of that threshold probability, that given recorded photon to the respective pixel in the sinogram B. Note that, in various cases, application of binomial selection to a single photon in such fashion can be considered or otherwise referred to as a photon-wise Bernoulli trial.

In various aspects, the split component can repeat such probabilistic assignments for each recorded photon in the given pixel, thereby causing the respective pixel of the sinogram A and the respective pixel of the sinogram B to become filled with recorded photons. Note that the photon-count of the respective pixel of the sinogram A and the photon-count of the respective pixel of the sinogram B can sum to the photon-count of the given pixel (e.g., the given pixel can contain any suitable number of recorded photons, and those recorded photons can be probabilistically split up or otherwise divided, according to the threshold probability, among the respective pixel of the sinogram A and the respective pixel of the sinogram B). In other words, the respective pixel of the sinogram A and the respective pixel of the sinogram B can be considered as being complementary to each other. In still other words, the respective pixel of the sinogram A and the respective pixel of the sinogram B can have photon-counts that are both lesser than the photon-count of the given pixel, hence the term "reduced-photon-count."

Note that, although the above paragraphs describe the split component as performing a series of Bernoulli trials (e.g., as performing binomial selection on a photon-by-photon basis, one photon at a time), this is a mere non-limiting example for ease of explanation. In various aspects, the split component can instead perform photon-wise binomial selection according to any suitable batch sizes (e.g., according to more than one photon at a time). Indeed, a summation of independent Bernoulli trials can be considered as forming a binomial distribution. Accordingly, rather than probabilistically assigning individual photons of the given pixel to the respective pixel of the sinogram A or instead to the respective pixel of the sinogram B via Bernoulli trials (e.g., one photon at a time), the split component can use binomial selection to probabilistically assign the photons recorded in the given pixel to the respective pixel of the sinogram A by sampling a binomial distribution. In such case, any recorded photons of the given pixel that are not assigned to the respective pixel of the sinogram A by such sampling can thus be assigned to the respective pixel of the sinogram B.

In various aspects, the split component can repeat the above-described actions for each pixel in the given sinogram and for each sinogram in the set of sinograms. In this way, the pixels of the first set of reduced-photon-count sinograms can be filled with recorded photons from the set of sinograms in proportions approximating the threshold probability, and the pixels of the second set of reduced-photon-count sinograms can be filled with recorded photons from the set of sinograms in proportions approximating the complement of the threshold probability. In other words, the first set of reduced-photon-count sinograms and the second set of reduced-photon-count sinograms can be considered as visually depicting the same (or approximately the same) patterns or arrangements of projection data as the set of sinograms and as each other, but with differing dosage levels.

In various embodiments, the reconstruction component of the computerized tool can electronically generate a pair of images based on the first set of reduced-photon-count sinograms and based on the second set of reduced-photon-count sinograms. More specifically, the reconstruction component can apply any suitable image reconstruction techniques (e.g., material decomposition, filtered backprojection) to the first set of reduced-photon-count sinograms, thereby yielding a first CT image. In various aspects, the first CT image can exhibit any suitable format, size, or dimensionality (e.g., can be a two-dimensional array of pixels, can be a three-dimensional array of voxels). In some cases, the first CT image can be a plurality of first material basis images (e.g., a plurality of first CT images, each depicting the anatomical structures of the medical patient according to a respective material basis such as water or calcium). Likewise, the reconstruction component can apply any suitable image reconstruction techniques to the second set of reduced-photon-count sinograms, thereby yielding a second CT image. Just as above, the second CT image can exhibit any suitable format, size, or dimensionality. Moreover, and just as above, the second CT image can, in various instances, be a plurality of second material basis images.

In various aspects, because the split component can assign recorded photons to the first set of reduced-photon-count sinograms according to the threshold probability, and because the first CT image can be generated based on the first set of reduced-photon-count sinograms, the threshold probability can be considered as corresponding to or otherwise serving as a proxy for a radiation dosage of the first CT image. Likewise, because the split component can assign recorded photons to the second set of reduced-photon-count sinograms according to the complement of the threshold probability, and because the second CT image can be generated based on the second set of reduced-photon-count sinograms, the complement of the threshold probability can be considered as corresponding to or otherwise serving as a proxy for a radiation dosage of the second CT image. Accordingly, if the threshold probability is less than 50%, then the first CT image and the second CT image can both be considered as depicting the anatomical structures of the medical patient (e.g., depicting the same anatomical structures of the same medical patient as each other), but the first CT image can do so according to a lower radiation dosage than the second CT image. In such case, the first CT image can be considered as a noisier version of the second CT image. Conversely, if the threshold probability is greater than 50%, then the first CT image and the second CT image can both be considered as depicting the anatomical structures of the medical patient, but the first CT image can do so according to a higher radiation dosage than the second CT image. In such case, the first CT image can be considered as a less noisy version of the second CT image. In any case, application of photon-count splitting via photon-wise binomial selection can cause whatever visual noise is present within the first CT image to be independent of (e.g., to be not correlated with) whatever visual noise is present within the second CT image.

In various embodiments, the training component of the computerized tool can electronically train, in supervised fashion, a deep learning neural network on the first CT image and the second CT image.

In various instances, the deep learning neural network can exhibit any suitable internal architecture. For example, the deep learning neural network can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the deep learning neural network can include any suitable numbers of neurons in various layers (e.g., different layers can have the same or different numbers of neurons as each other). As yet another example, the deep learning neural network can include any suitable activation functions (e.g., softmax, sigmoid, hyperbolic tangent, rectified linear unit) in various neurons (e.g., different neurons can have the same or different activation functions as each other). As still another example, the deep learning neural network can include any suitable interneuron connections or interlayer connections (e.g., forward connections, skip connections, recurrent connections).

No matter the internal architecture of the deep learning neural network, the training component can train the deep learning neural network to perform image denoising using the first CT image and the second CT image. Indeed, despite the first CT image and the second CT image both being noisy, the deep learning neural network can learn to perform image denoising since whatever noise is present in the first CT image can be independent from whatever noise is present in the second CT image. In any case, prior to the start of such training, the internal parameters (e.g., weights, biases, convolutional kernels) of the deep learning neural network can be randomly initialized.

In various aspects, the training component can feed the first CT image to the deep learning neural network, which can cause the deep learning neural network to produce an output. For example, the first CT image can be received by an input layer of the deep learning neural network, the first CT image can complete a forward pass through one or more hidden layers of the deep learning neural network, and an output layer of the deep learning neural network can compute the output based on activations generated by the one or more hidden layers.

In various aspects, the output can be considered as a predicted or inferred result that the deep learning neural network believes should correspond to the first CT image. In contrast, the second CT image can be considered as the correct, accurate, or ground-truth result that is known or deemed to correspond to the first CT image. Note that, if the deep learning neural network has so far undergone no or little training, then the output can be highly inaccurate (e.g., the output can be very different from the second CT image).

In any case, the training component can compute one or more errors or losses (e.g., mean absolute errors (MAE), mean squared errors (MSE), cross-entropies) between the output and the second CT image. In various aspects, the training component can update the internal parameters of the deep learning neural network by performing backpropagation (e.g., stochastic gradient descent) driven by such computed errors or losses.

This is a non-limiting example showing how the training component can train the deep learning neural network on the first CT image and the second CT image. In other words, the first CT image can be considered as a training input, and the second CT image can be considered as a ground-truth annotation or target corresponding to the training input. In still other words, the first CT image and the second CT image can together be considered as an input-annotation pair. In various aspects, the computerized tool described herein can generate a respective input-annotation pair for each set of sinograms generated by the (or any other) PCD-CT scanner. Accordingly, if multiple sets of sinograms generated by PCD-CT scanners are available, then the access component, the split component, and the reconstruction component can work, as described above, to generate multiple input-annotation pairs. Such multiple input-annotation pairs can be considered as an entire training dataset on which the training component can train the deep learning neural network. In such case, the training component can repeat the above-mentioned execution-update procedure for each input-annotation pair in the training dataset, with the result being that the internal parameters of the deep learning neural network can become iteratively optimized to accurately denoise inputted CT images. In various aspects, the training component can implement any suitable training batch sizes, any suitable training termination criteria, or any suitable error, loss, or objective functions.

After the deep learning neural network has been trained, the deployment component of the computerized tool can electronically deploy the deep learning neural network in any suitable operational context. That is, the deployment component can execute the deep learning neural network on any given CT image that is encountered in the field (e.g., on any given CT image for which denoising is desired).

Note that the first CT image and the second CT image can both be generated from the set of sinograms captured by the PCD-CT scanner, and the set of sinograms can be the results of a single scan performed by the PCD-CT scanner. In other words, various embodiments described herein can avoid repeat scans and the problems that plague repeat scans (e.g., misregistration, excessive radiation exposure). Moreover, because the first CT image and the second CT image can be generated by photon-wise binomial selection, any noise present within the first CT image can be independent of (e.g., uncorrelated with) any noise present within the second CT image. In other words, various embodiments described herein can avoid the problem of correlated noise. Furthermore, as described herein, the present inventors experimentally verified that training a deep learning neural network to perform image denoising on training data that has been generated via photon-count splitting (e.g., via photon-wise binomial selection) can cause the deep learning neural network to exhibit comparable denoising accuracy as compared to training the deep learning neural network on perfectly clean (e.g., noiseless) ground-truths.

Various embodiments described herein can be employed to use hardware or software to solve problems that are highly technical in nature (e.g., to facilitate generation of image denoising training data via photon-count splitting), that are not abstract and that cannot be performed as a set of mental acts by a human. Further, some of the processes performed can be performed by a specialized computer (e.g., a deep learning neural network having internal parameters such as convolutional kernels) for carrying out defined tasks related to generation of image denoising training data via photon-count splitting. For example, such defined tasks can include: accessing, by a device operatively coupled to a processor, a set of sinograms generated by a photon-counting computed tomography scanner; splitting, by the device, the set of sinograms into a first reduced-photon-count set of sinograms and a second reduced-photon-count set of sinograms; converting, by the device and via image reconstruction, the first reduced-photon-count set of sinograms into at least one training input image and the second reduced-photon-count set of sinograms into at least one training output image; and training, by the device, a deep learning neural network based on the at least one training input image and the at least one training output image.

Such defined tasks are not performed manually by humans. Indeed, neither the human mind nor a human with pen and paper can electronically access sinograms captured by a PCD-CT scanner, electronically split the sinograms into two reduced-photon-count sets of sinograms using photon-wise binomial selection, electronically generate an input-annotation pair by applying image reconstruction (e.g., material decomposition, filtered backprojection) to the two reduced-photon-count sets of sinograms, and electronically train (e.g., via backpropagation) a deep learning neural network on the input-annotation pair. Indeed, a PCD-CT scanner is an inherently-computerized device that cannot be implemented in any way by the human mind without computers. Likewise, a deep learning neural network is also an inherently-computerized construct that cannot be implemented in any way by the human mind without computers. Accordingly, a computerized tool that can train a deep learning neural network on sinograms generated by a PCD-CT scanner is likewise inherently-computerized and cannot be implemented in any sensible, practical, or reasonable way without computers.

Moreover, various embodiments described herein can integrate into a practical application various teachings relating to generation of image denoising training data via photon-count splitting. As explained above, some existing techniques train a deep learning neural network to perform image denoising on CT images by utilizing perfectly clean (e.g., completely noiseless) ground-truths. However, such perfectly clean ground-truths cannot feasibly or practicably be obtained at scale (e.g., in sufficiently large volumes) in clinical settings. As also mentioned above, other existing techniques train a deep learning neural network to perform image denoising on CT images using training inputs generated by low-dose CT scans and corresponding training targets generated by high-dose CT scans. However, such techniques involve repeat scans of any given medical patient, which exposes the medical patient to excessive radiation and which introduces registration errors. As also discussed above, various other existing techniques train a deep learning neural network to perform image denoising on CT images using training targets generated by high-dose CT scans and corresponding training inputs generated by noise insertion. Although such techniques avoid repeat scans, they introduce the problem of correlated noise.

Various embodiments described herein can address these technical problems. Specifically, various embodiments described herein can include obtaining a set of sinograms from a PCD-CT scanner, splitting the set of sinograms into two reduced-photon-count sets of sinograms via photon-wise binomial selection, and generating a training input and a corresponding training target by applying image reconstruction (e.g., material decomposition) to the two reduced-photon-count sets of sinograms. Because the set of sinograms can be the result of a single scan of a medical patient, the problem of repeat scans can be avoided. Moreover, because photon-count splitting via photon-wise binomial selection can be implemented, any noise in the training input can be uncorrelated with (e.g., can be independent of) any noise in the training target. Furthermore, experimental results demonstrate that training a deep learning neural network in this fashion can achieve comparable denoising performance as training the deep learning neural network with perfectly clean (e.g., completely noiseless) ground-truths. That is, various embodiments described herein can ameliorate various disadvantages of existing techniques. Thus, various embodiments described herein certainly constitute a concrete and tangible technical improvement in the field of image denoising. Therefore, various embodiments described herein clearly qualify as useful and practical applications of computers.

Furthermore, various embodiments described herein can control real-world tangible devices based on the disclosed teachings. For example, various embodiments described herein can electronically train or execute real-world deep learning neural networks on real-world CT images generated from real-world sinograms that were captured by real-world PCD-CT scanners.

It should be appreciated that the herein figures and description provide non-limiting examples of various embodiments and are not necessarily drawn to scale.

FIG. 1 illustrates a block diagram of an example, non-limiting system 100 that can facilitate generation of image denoising training data via photon-count splitting in accordance with one or more embodiments described herein. As shown, a denoising training system 102 can be electronically integrated, via any suitable wired or wireless electronic connections, with a deep learning neural network 104 or with a photon-count-detector computed tomography scanner 106 (here after "PCD-CT scanner 106").

In various embodiments, the deep learning neural network 104 can have or otherwise exhibit any suitable internal architecture. For instance, the deep learning neural network 104 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

In various embodiments, the PCD-CT scanner 106 can be any suitable computed-tomography scanner that utilizes photon-counting-detector technology, as opposed to energy-integrating-detector technology. Accordingly, when performing a CT scan on a medical patient, the PCD-CT scanner 106 can count the number of individual photons within any suitable energy band that are detected at any given point (e.g., at any given gantry angle and projection direction distance) in the CT scan.

As shown, the PCD-CT scanner 106 can, in various aspects, electronically generate or otherwise electronically capture a set of sinograms 108. In various instances, the set of sinograms 108 can be considered as the raw projection data collected by the PCD-CT scanner 106 during a single scan of a single medical patient. In other words, the PCD-CT scanner 106 can scan any suitable anatomical structure of the medical patient, and the set of sinograms 108 can be considered as the raw projection data that results from such scan. As some non-limiting examples, the anatomical structure can be any suitable tissue of the medical patient (e.g., bone tissue, lung tissue, muscle tissue), any suitable organ of the medical patient (e.g., heart, liver, lung, brain), any suitable bodily fluid of the medical patient (e.g., blood, amniotic fluid), any other suitable body part of the medical patient, or any suitable portion thereof. In some cases, the PCD-CT scanner 106 can generate or capture the set of sinograms 108 using a full (e.g., 100%) radiation dosage level. In other cases, the PCD-CT scanner 106 can generate or capture the set of sinograms 108 using a less-than-full (e.g., less than 100%) radiation dosage level.

In various aspects, it can be desired to train the deep learning neural network 104 to perform image denoising. In various instances, the denoising training system 102 can, as described herein, generate a training input-target pair of CT images based on the set of sinograms 108, and the denoising training system 102 can train the deep learning neural network 104 on such training input-target pair.

In various embodiments, the denoising training system 102 can comprise a processor 110 (e.g., computer processing unit, microprocessor) and a non-transitory computer-readable memory 112 that is operably or operatively or communicatively connected or coupled to the processor 110. The non-transitory computer-readable memory 112 can store computer-executable instructions which, upon execution by the processor 110, can cause the processor 110 or other components of the denoising training system 102 (e.g., access component 114, split component 116, reconstruction component 118, training component 120, or deployment component 122) to perform one or more acts. In various embodiments, the non-transitory computer-readable memory 112 can store computer-executable components (e.g., access component 114, split component 116, reconstruction component 118, training component 120, or deployment component 122), and the processor 110 can execute the computer-executable components.

In various embodiments, the denoising training system 102 can comprise an access component 114. In various aspects, the access component 114 can electronically receive or otherwise electronically access the deep learning neural network 104 or the set of sinograms 108. In various instances, the access component 114 can electronically retrieve the deep learning neural network 104 from any suitable centralized or decentralized data structures (not shown) or from any suitable centralized or decentralized computing devices (not shown). Similarly, in various cases, the access component 114 can electronically retrieve the set of sinograms 108 from any suitable centralized or decentralized data structures (not shown) or from any suitable centralized or decentralized computing devices (not shown). As a non-limiting example, the PCD-CT scanner 106 can transmit the set of sinograms 108 to the access component 114. In any case, the access component 114 can electronically obtain or access the deep learning neural network 104 or the set of sinograms 108, such that other components of the denoising training system 102 can electronically interact with the deep learning neural network 104 or with the set of sinograms 108.

In various embodiments, the denoising training system 102 can comprise a split component 116. In various aspects, as described herein, the split component 116 can split, in photon-wise fashion, the set of sinograms into a first set of reduced-photon-count sinograms and a second set of reduced-photon-count sinograms.

In various embodiments, the denoising training system 102 can comprise a reconstruction component 118. In various instances, as described herein, the reconstruction component 118 can generate a training input image based on the first set of reduced-photon-count sinograms and a training output image based on the second set of reduced-photon-count sinograms.

In various embodiments, the denoising training system 102 can comprise a training component 120. In various cases, as described herein, the training component 120 can train the deep learning neural network in supervised fashion based on the training input image and the training output image.

In various embodiments, the denoising training system 102 can comprise a deployment component 122. In various aspects, as described herein, the deployment component 122 can deploy or otherwise execute the deep learning neural network, post-training, on any suitable desired images.

Figure 2:
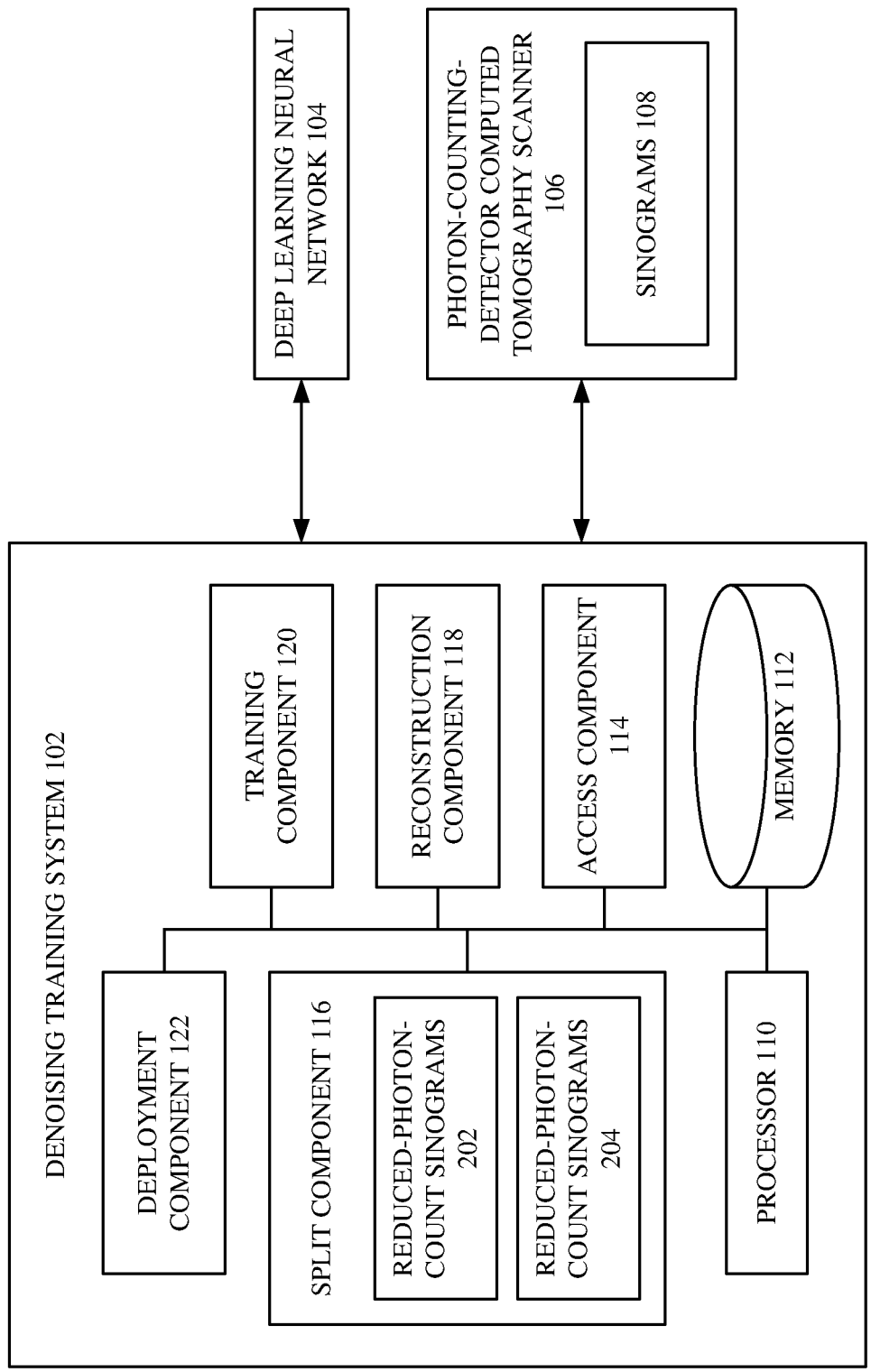
FIG. 2 illustrates a block diagram of an example, non-limiting system including various sets of reduced-photon-count sinograms that facilitates generation of image denoising training data via photon-count splitting in accordance with one or more embodiments described herein.

FIG. 2 illustrates a block diagram of an example, non-limiting system 200 including various sets of reduced-photon-count sinograms that can facilitate generation of image denoising training data via photon-count splitting in accordance with one or more embodiments described herein. As shown, the system 200 can, in some cases, comprise the same components as the system 100, and can further comprise a set of reduced-photon-count sinograms 202 and a set of reduced-photon-count sinograms 204.

In various embodiments, the split component 116 can electronically split the set of sinograms 108 into the set of reduced-photon-count sinograms 202 and the set of reduced-photon-count sinograms 204. More specifically, the split component 116 can, in various aspects, generate the set of reduced-photon-count sinograms 202 and the set of reduced-photon-count sinograms 204 by applying photon-wise binomial selection to the set of sinograms 108. Various non-limiting aspects are described with respect to FIGS. 3-7.

FIGS. 3-7 illustrate example, non-limiting block diagrams 300, 400, 500, 600, and 700 showing how the set of reduced-photon-count sinograms 202 and the set of reduced-photon-count sinograms 204 can be generated in accordance with one or more embodiments described herein.

Figure 3:
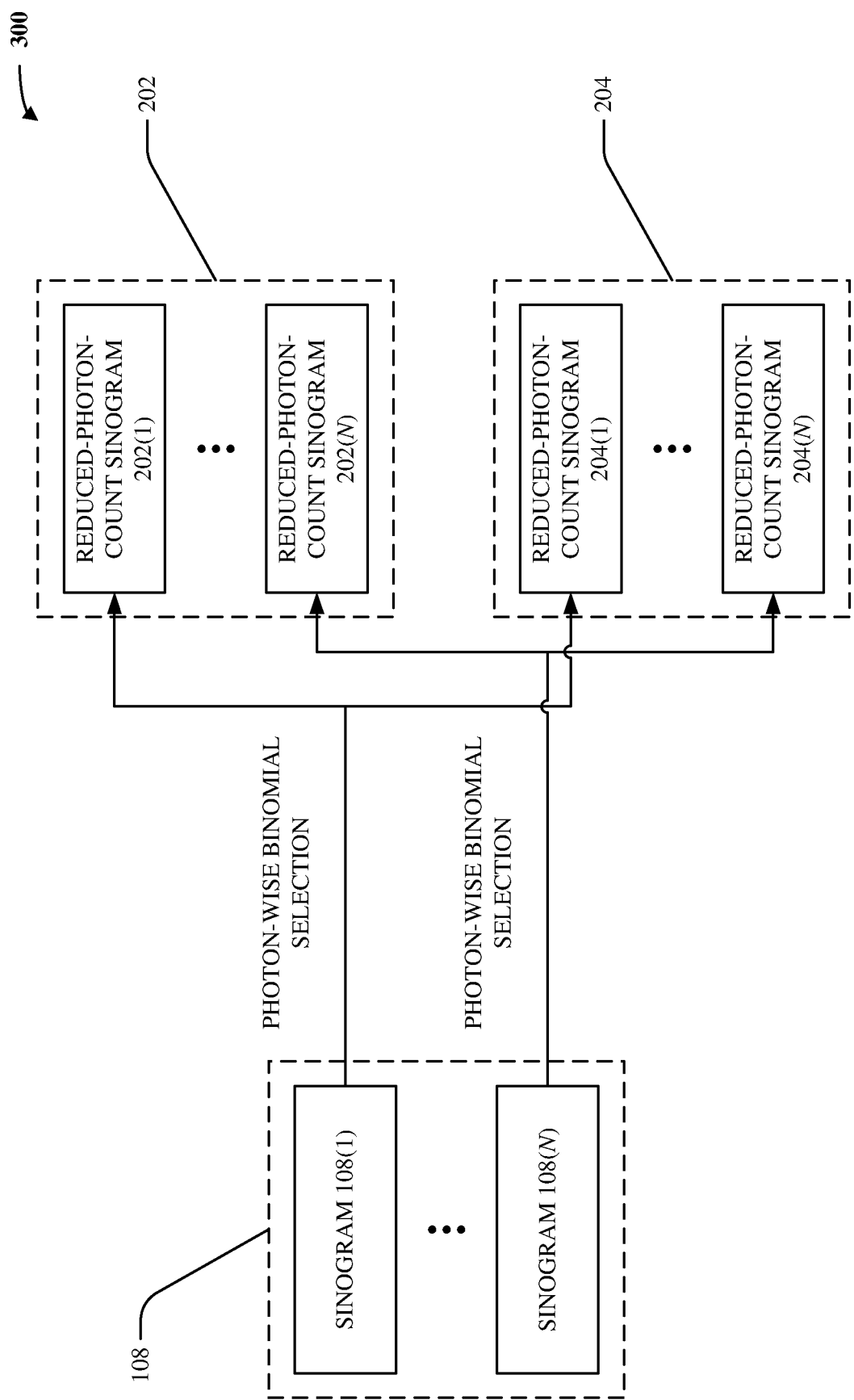

First, consider FIG. 3. As shown, the set of sinograms 108 can, in various aspects, comprise n sinograms for any suitable positive integer n: a sinogram 108(1) to a sinogram 108(n). In various instances, a sinogram within the set of sinograms 108 can exhibit any suitable format, size, or dimensionality. As a non-limiting example, a sinogram within the set of sinograms 108 can be an a-by-b array of pixels, for any suitable positive integers a and b. In various cases, different sinograms within the set of sinograms 108 can have the same format or dimensionality as each other (e.g., each of the set of sinograms 108 can be an a-by-b array of pixels).

In various aspects, because the set of sinograms 108 can be generated by the PCD-CT scanner 106, the set of sinograms 108 can be collated by or otherwise according to photon energy bins. Indeed, because the PCD-CT scanner 106 can implement or otherwise utilize photon-counting-detector technology (as opposed to energy-integrating-detector technology), the PCD-CT scanner 106 can count how many individual photons within any suitable photon energy range strike any suitable photon-counting-detector at any suitable gantry angle. In particular, if a given sinogram in the set of sinograms 108 is an a-by-b pixel array that corresponds to a given photon energy bin, then: one principal dimension or axis of such given sinogram can be considered as spanning different gantry angles of the PCD-CT scanner 106; another principal dimension or axis of such given sinogram can be considered as spanning distances along a projection direction of the PCD-CT scanner 106; any given pixel of such given sinogram can be considered as being positioned or located at a given gantry-angle-and-projection-distance tuple; and the given pixel's value can be considered as the number of individual photons falling in the given photon energy bin that were detected when the PCD-CT scanner 106 was configured at the given gantry-angle-and-projection-distance tuple. Because the set of sinograms 108 can have a cardinality of n, the set of sinograms 108 can be considered as being collated by or otherwise according to n distinct or unique photon energy bins. For example, the sinogram 108(1) can be considered as corresponding to a first photon energy bin (e.g., a first range of photon energy values, as measured in electron-volts), whereas the sinogram 108(n) can be considered as corresponding to an n-th photon energy bin (e.g., an n-th range of photon energy values, as measured in electron-volts). In various cases, such n photon energy bins can be disjoint (e.g., non-overlapping) with each other.

In various aspects, as shown, the set of reduced-photon-count sinograms 202 can respectively correspond (e.g., in one-to-one fashion) to the set of sinograms 108. Accordingly, since the set of sinograms 108 can have n sinograms, the set of reduced-photon-count sinograms 202 can likewise have n sinograms: a reduced-photon-count sinogram 202(1) to a reduced-photon-count sinogram 202(n). In other words, the set of reduced-photon-count sinograms 202 can be considered as having the same sinogram cardinality (e.g., the same number of sinograms) as the set of sinograms 108. In various aspects, each of the set of reduced-photon-count sinograms 202 can have the same format or dimensionality as any of the set of sinograms 108. For example, if each of the set of sinograms 108 is an a-by-b array of pixels, then each of the set of reduced-photon-count sinograms 202 can likewise be an a-by-b array of pixels. Moreover, because the set of sinograms 108 can be collated by or otherwise according to photon energy bin, the set of reduced-photon-count sinograms 202 can likewise be collated by or otherwise according to photon energy bin. For example, the reduced-photon-count sinogram 202(1) can correspond to the first photon energy bin, just like the sinogram 108(1). Similarly, the reduced-photon-count sinogram 202(n) can correspond to the n-th photon energy bin, just like the sinogram 108(n).

Similarly, as shown, the set of reduced-photon-count sinograms 204 can respectively correspond (e.g., in one-to-one fashion) to the set of sinograms 108. Accordingly, since the set of sinograms 108 can have n sinograms, the set of reduced-photon-count sinograms 204 can also have n sinograms: a reduced-photon-count sinogram 204(1) to a reduced-photon-count sinogram 204(n). In other words, the set of reduced-photon-count sinograms 204 can be considered as having the same sinogram cardinality (e.g., the same number of sinograms) as the set of sinograms 108. Just as above, each of the set of reduced-photon-count sinograms 204 can have the same format or dimensionality as any of the set of sinograms 108. For example, if each of the set of sinograms 108 is an a-by-b array of pixels, then each of the set of reduced-photon-count sinograms 204 can likewise be an a-by-b array of pixels. Furthermore, because the set of sinograms 108 can be collated by or otherwise according to photon energy bin, the set of reduced-photon-count sinograms 204 can likewise be collated by or otherwise according to photon energy bin. For example, the reduced-photon-count sinogram 204(1) can correspond to the first photon energy bin, just like the sinogram 108(1). Similarly, the reduced-photon-count sinogram 204(n) can correspond to the n-th photon energy bin, just like the sinogram 108(n).

In various aspects, respective ones of the set of reduced-photon-count sinograms 202 and of the set of reduced-photon-count sinograms 204 can be generated by applying photon-count splitting via photon-wise binomial selection to respective ones of the set of sinograms 108. For example, the split component 116 can generate the reduced-photon-count sinogram 202(1) and the reduced-photon-count sinogram 204(1) by applying photon-wise binomial selection to the sinogram 108(1). Thus, the sinogram 108(1), the reduced-photon-count sinogram 202(1), and the reduced-photon-count sinogram 204(1) can all be considered as corresponding to each other. Similarly, as another example, the split component 116 can generate the reduced-photon-count sinogram 202(n) and the reduced-photon-count sinogram 204(n) by applying photon-wise binomial selection to the sinogram 108(n). So, the sinogram 108(n), the reduced-photon-count sinogram 202(n), and the reduced-photon-count sinogram 204(n) can all be considered as corresponding to each other. Various non-limiting aspects of such photon-wise binomial selection are described in more detail with respect to FIGS. 4-7.

As shown, FIG. 4 depicts an example, non-limiting embodiment of the sinogram 108(1). As shown, the sinogram 108(1) can have a set of pixels 402. In various aspects, the set of pixels 402 can include p pixels for any suitable positive integer p: a pixel 402(1) to a pixel 402(p). In various aspects, p can be considered as representing the total number of gantry-angle-and-projection-distance tuples that were swept by the PCD-CT scanner 106 when generating the set of sinograms 108 (e.g., if the sinogram 108(1) is an a-by-b array of pixels, then p=ab). Moreover, because the sinogram 108(1) can be created by the PCD-CT scanner 106, and because the sinogram 108(1) can correspond to the first photon energy bin, each pixel of the sinogram 108(1) can be considered as recording or otherwise representing how many individual photons within the first photon energy bin were detected by the PCD-CT scanner 106 at a respective gantry-angle-and-projection-distance tuple. For example, the pixel 402(1) can correspond to a first gantry-angle-and-projection-distance tuple of the PCD-CT scanner 106, and so the pixel 402(1) can be considered as representing how many individual photons falling within the first photon energy bin were detected by the PCD-CT scanner 106 at the first gantry-angle-and-projection-distance tuple. As another example, the pixel 402(p) can correspond to a p-th gantry-angle-and-projection-distance tuple of the PCD-CT scanner 106, and so the pixel 402(p) can be considered as representing how many individual photons falling within the first photon energy bin were detected by the PCD-CT scanner 106 at the p-th gantry-angle-and-projection-distance tuple.

In various aspects, suppose that the pixel 402(1) has a pixel value of $C_{1\_Total}$, for any suitable positive integer $C_{1\_Total}$. In such case, the pixel 402(1) can be considered as having recorded $C_{1\_Total}$ individual or distinct photons having energies within the first photon energy bin. Accordingly, the pixel 402(1) can be considered as comprising or otherwise representing a set of recorded photons 404(1), where the cardinality of the set of recorded photons 404(1) can be equal to $C_{1\_Total}$. That is, the set of recorded photons 404(1) can include $C_{1\_Total}$ photons: a recorded photon 404(1)(1) to a recorded photon 404(1)($C_{1\_Total}$).

Similarly, suppose that the pixel 402(p) has a pixel value of $C_{p\_Total}$, for any suitable positive integer $C_{p\_Total}$. In such case, the pixel 402(p) can be considered as having recorded $C_{p\_Total}$ individual or distinct photons having energies within the first photon energy bin. Accordingly, the pixel 402(p) can be considered as comprising or otherwise representing a set of recorded photons 404(p), where the cardinality of the set of recorded photons 404(p) can be equal to $C_{p\_Total}$. That is, the set of recorded photons 404(p) can include $C_{p\_Total}$ photons: a recorded photon 404(p)(1) to a recorded photon 404(p)($C_{p\_Total}$).

In various aspects, as shown, the reduced-photon-count sinogram 202(1) can have a set of pixels 406. As mentioned above, each of the set of sinograms 108 and each of the set of reduced-photon-count sinograms 202 can have the same number or arrangement of pixels as each other. Accordingly, because the set of pixels 402 of the sinogram 108(1) can have a cardinality of p, the set of pixels 406 of the reduced-photon-count sinogram 202(1) can likewise have a cardinality of p. That is, the set of pixels 406 can include p pixels: a pixel 406(1) to a pixel 406(p). In various instances, as shown, each of the set of pixels 406 can be initially empty. In other words, each of the set of pixels 406 can begin with a pixel value of zero. For example, the pixel 406(1) can begin (e.g., prior to application of photon-wise binomial selection by the split component 116) with a pixel value of zero, indicating that no recorded photons are yet represented by the pixel 406(1). As another example, the pixel 406(p) can begin (e.g., prior to application of photon-wise binomial selection by the split component 116) with a pixel value of zero, indicating that no recorded photons are yet represented by the pixel 406(p). However, this is a mere non-limiting embodiment. In various other cases, each of the set of pixels 406 can be initialized in any other suitable fashion.

In any case, the set of pixels 406 can respectively correspond (e.g., in one-to-one fashion) to the set of pixels 402. For instance, the pixel 406(1) can correspond to the pixel 402(1) (e.g., both the pixel 402(1) and the pixel 406(1) can correspond to the first gantry-angle-and-projection-distance tuple of the PCD-CT scanner 106). Likewise, the pixel 406(p) can correspond to the pixel 402(p) (e.g., both the pixel 402(p) and the pixel 406(p) can correspond to the p-th gantry-angle-and-projection-distance tuple of the PCD-CT scanner 106).

In various aspects, as shown, the reduced-photon-count sinogram 204(1) can have a set of pixels 408. As mentioned above, each of the set of sinograms 108 and each of the set of reduced-photon-count sinograms 204 can have the same number or arrangement of pixels as each other. Accordingly, because the set of pixels 402 of the sinogram 108(1) can have a cardinality of p, the set of pixels 408 of the reduced-photon-count sinogram 204(1) can likewise have a cardinality of p. That is, the set of pixels 408 can include p pixels: a pixel 408(1) to a pixel 408(p). Just as with the set of pixels 406, each of the set of pixels 408 can be initially empty. That is, each of the set of pixels 408 can begin with a pixel value of zero. For example, the pixel 408(1) can begin (e.g., prior to application of photon-wise binomial selection by the split component 116) with a pixel value of zero, indicating that no recorded photons are yet represented by the pixel 408(1). As another example, the pixel 408(p) can begin (e.g., prior to application of photon-wise binomial selection by the split component 116) with a pixel value of zero, indicating that no recorded photons are yet represented by the pixel 408(p). However, this is a mere non-limiting embodiment. In various other cases, each of the set of pixels 408 can be initialized in any other suitable fashion.

In any case, the set of pixels 408 can respectively correspond (e.g., in one-to-one fashion) to the set of pixels 402. For instance, the pixel 408(1) can correspond to the pixel 402(1) (e.g., both the pixel 402(1) and the pixel 408(1) can correspond to the first gantry-angle-and-projection-distance tuple of the PCD-CT scanner 106). Likewise, the pixel 408(p) can correspond to the pixel 402(p) (e.g., both the pixel 402(p) and the pixel 408(p) can correspond to the p-th gantry-angle-and-projection-distance tuple of the PCD-CT scanner 106).

In various aspects, the split component 116 can iterate through each of the set of pixels 402. Moreover, for any given pixel in the set of pixels 402, the split component 116 can iterate through each recorded photon contained within or otherwise represented by that given pixel. For any given recorded photon in that given pixel, the split component 116 can probabilistically assign the given recorded photon either to whichever of the set of pixels 406 corresponds to the given pixel or to whichever of the set of pixels 408 corresponds to the given pixel. Such probabilistic assignment of recorded photons can be considered or otherwise referred to as photon-count splitting via photon-wise binomial selection. Non-limiting examples of such photon-wise binomial selection are shown with respect to FIGS. 5-6.

Figure 5:
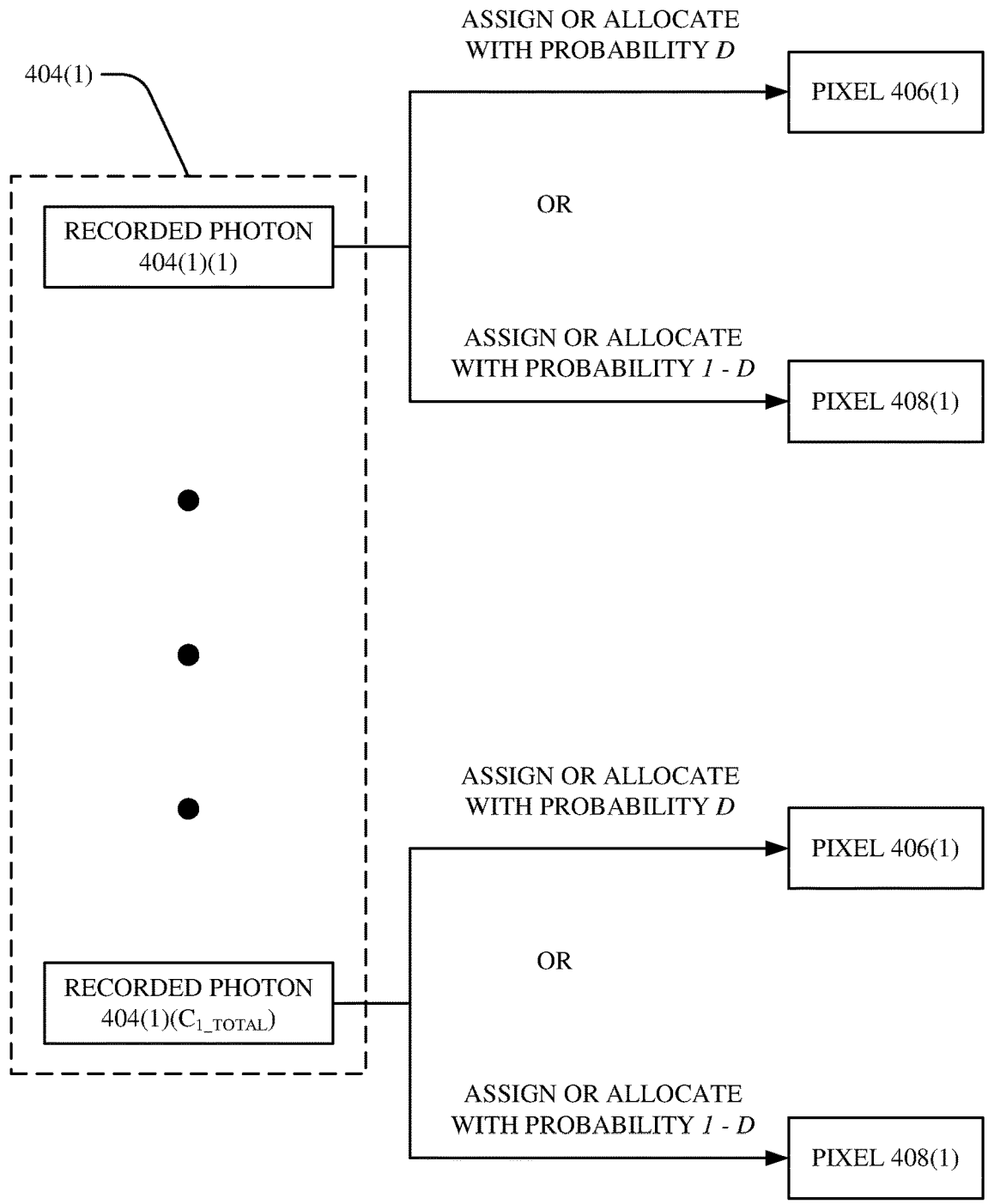

FIG. 5 shows, in a non-limiting example fashion, how the split component 116 can iteratively apply photon-count splitting via photon-wise binomial selection to each recorded photon of the pixel 402(1) (e.g., to each of the set of recorded photons 404(1)).

In various aspects, the split component 116 can consider the recorded photon 404(1)(1) of the pixel 402(1). Because the recorded photon 404(1)(1) can be represented by the pixel 402(1), and because the pixel 402(1) can correspond to both the pixel 406(1) of the reduced-photon-count sinogram 202(1) and the pixel 408(1) of the reduced-photon-count sinogram 204(1), the split component 116 can apply photon-wise binomial selection to assign or otherwise allocate the recorded photon 404(1)(1) to either the pixel 406(1) or to the pixel 408(1). In other words, the split component 116 can insert, with a probability of d for any suitable real number d where 0<d<1, the recorded photon 404(1)(1) into the pixel 406(1), or the split component 116 can instead insert, with a probability of 1-d (e.g., the complement of d), the recorded photon 404(1)(1) into the pixel 408(1). In still other words, the recorded photon 404(1)(1) can have a 100d percent-chance of being placed within the pixel 406(1) (e.g., and thereby incrementing the value of the pixel 406(1) by one) and a 100(1-d) percent-chance of instead being placed within the pixel 408(1) (e.g., and thereby instead incrementing the value of the pixel 408(1) by one).

Similarly, the split component 116 can consider the recorded photon 404(1)($C_{1\_Total}$) of the pixel 402(1). Because the recorded photon 404(1)($C_{1\_Total}$) can be represented by the pixel 402(1), and because the pixel 402(1) can correspond to both the pixel 406(1) of the reduced-photon-count sinogram 202(1) and the pixel 408(1) of the reduced-photon-count sinogram 204(1), the split component 116 can apply photon-wise binomial selection to assign or otherwise allocate the recorded photon 404(1)($C_{1\_Total}$) to either the pixel 406(1) or to the pixel 408(1). In other words, the split component 116 can insert, with a probability of d, the recorded photon 404(1)($C_{1\_Total}$) into the pixel 406(1), or the split component 116 can instead insert, with a probability of 1-d, the recorded photon 404(1)($C_{1\_Total}$) into the pixel 408(1). In still other words, the recorded photon 404(1) ($C_{1\_Total}$) can have a 100d percent-chance of being placed within the pixel 406(1) (e.g., and thereby incrementing the value of the pixel 406(1) by one) and a 100(1-d) percent-chance of instead being placed within the pixel 408(1) (e.g., and thereby instead incrementing the value of the pixel 408(1) by one).

Figure 6:
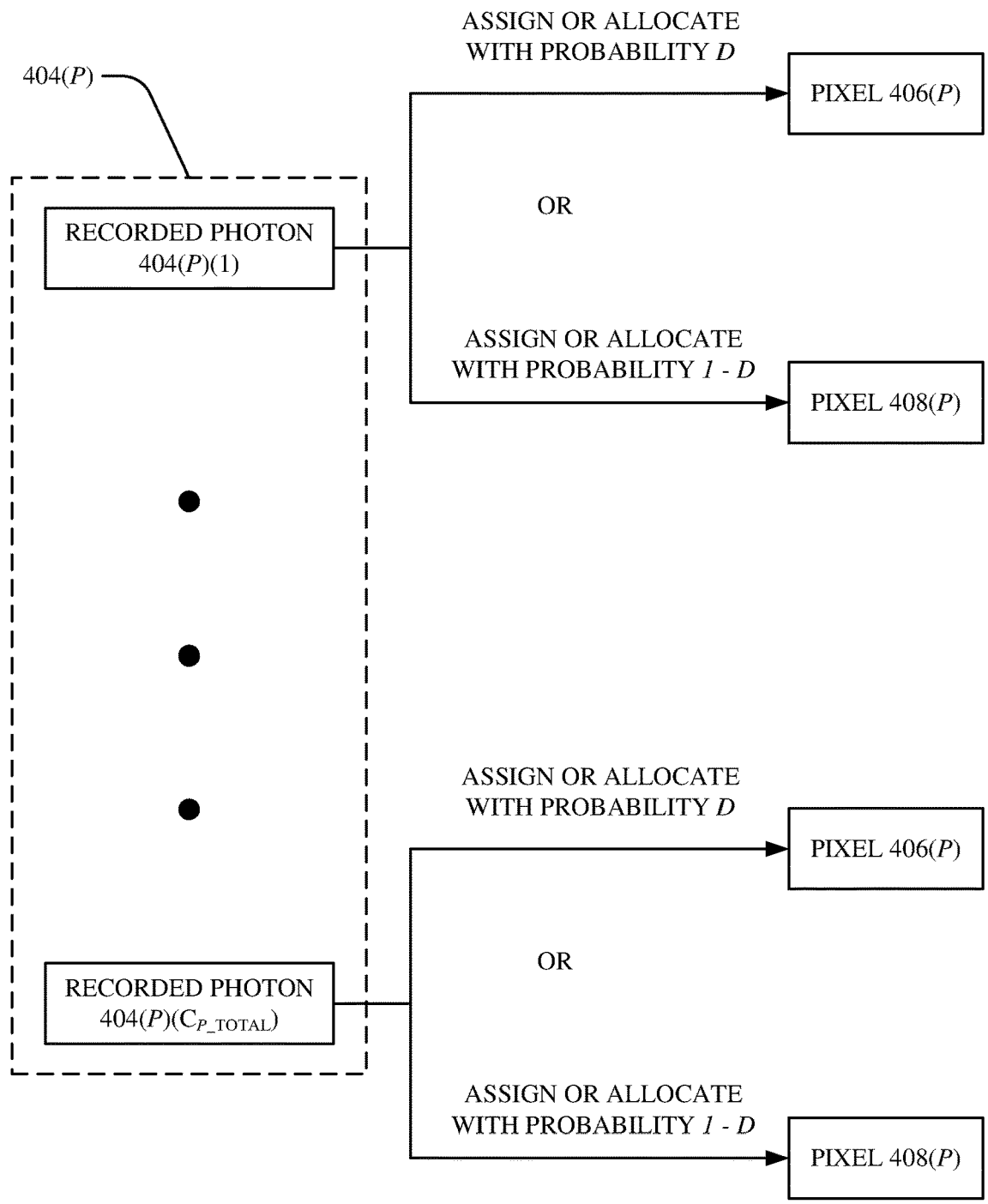

Now consider FIG. 6. FIG. 6 shows, in a non-limiting example fashion, how the split component 116 can iteratively apply photon-wise binomial selection to each recorded photon of the pixel 402(p) (e.g., to each of the set of recorded photons 404(p)).

In various aspects, the split component 116 can consider the recorded photon 404(p)(1) of the pixel 402(p). Because the recorded photon 404(p)(1) can be represented by the pixel 402(p), and because the pixel 402(p) can correspond to both the pixel 406(p) of the reduced-photon-count sinogram 202(1) and the pixel 408(p) of the reduced-photon-count sinogram 204(1), the split component 116 can apply photon-wise binomial selection to assign or otherwise allocate the recorded photon 404(p)(1) to either the pixel 406(p) or to the pixel 408(p). In other words, the split component 116 can insert, with a probability of d, the recorded photon 404(p)(1) into the pixel 406(p), or the split component 116 can instead insert, with a probability of 1-d, the recorded photon 404 (p)(1) into the pixel 408(p). In still other words, the recorded photon 404(p)(1) can have a 100d percent-chance of being placed within the pixel 406(p) (e.g., and thereby incrementing the value of the pixel 406(p) by one) and a 100(1-d) percent-chance of instead being placed within the pixel 408(p) (e.g., and thereby instead incrementing the value of the pixel 408(p) by one).

Similarly, the split component 116 can consider the recorded photon 404(p)($C_{p\_Total}$) of the pixel 402(p). Because the recorded photon 404(p)($C_{p\_Total}$) can be represented by the pixel 402(p), and because the pixel 402(p) can correspond to both the pixel 406(p) of the reduced-photon-count sinogram 202(1) and the pixel 408(p) of the reduced-photon-count sinogram 204(1), the split component 116 can apply photon-wise binomial selection to assign or otherwise allocate the recorded photon 404(p)($C_{p\_Total}$) to either the pixel 406(p) or to the pixel 408(p). In other words, the split component 116 can insert, with a probability of d, the recorded photon 404(p)($C_{p\_Total}$) into the pixel 406(p), or the split component 116 can instead insert, with a probability of 1-d, the recorded photon 404(p)($C_{p\_Total}$) into the pixel 408(p). In still other words, the recorded photon 404(p) ($C_{p\_Total}$) can have a 100d percent-chance of being placed within the pixel 406(p) (e.g., and thereby incrementing the value of the pixel 406(p) by one) and a 100(1-d) percent-chance of instead being placed within the pixel 408(p) (e.g., and thereby instead incrementing the value of the pixel 408(p) by one).

In this way, the split component 116 can utilize photon-wise binomial selection to probabilistically split the photons recorded in the sinogram 108(1) among the reduced-photon-count sinogram 202(1) and the reduced-photon-count sinogram 204(1). This is further discussed with respect to FIG. 7.

Figure 7:
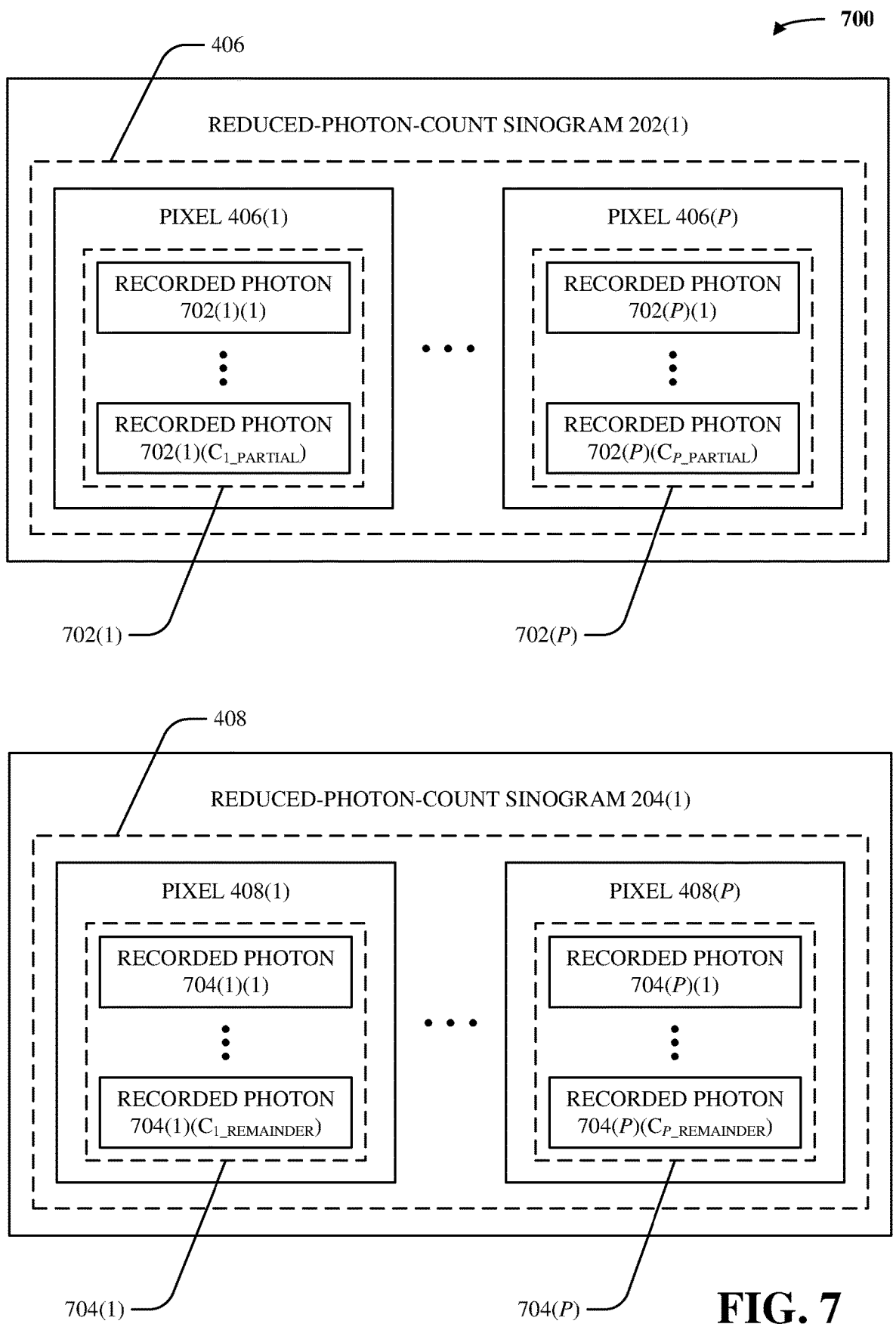

As shown, FIG. 7 depicts a non-limiting example embodiment of the reduced-photon-count sinogram 202(1), after application of photon-wise binomial selection by the split component 116.

In various aspects, as shown, the set of pixels 406 of the reduced-photon-count sinogram 202(1) can be no longer empty. For example, the pixel 406(1) can have a pixel value of $C_{1\_Partial}$, for any suitable positive integer $C_{1\_Partial}$, where $C_{1\_Partial} < C_{1\_Total}$, hence the term "reduced-photon-count." In other words, the pixel 406(1) can be considered as containing or otherwise representing a set of recorded photons 702(1), where the cardinality of the set of recorded photons 702(1) can be equal to $C_{1\_Partial}$. That is, the set of recorded photons 702(1) can have a recorded photon 702(1)(1) to a recorded photon 702(1)($C_{1\_Partial}$).

As another example, the pixel 406(p) can have a pixel value of $C_{p\_Partial}$, for any suitable positive integer $C_{p\_Partial}$ where $C_{p\_Partial} < C_{p\_Total}$, again hence the term "reduced-photon-count." That is, the pixel 406(p) can be considered as containing or otherwise representing a set of recorded photons 702(p), where the cardinality of the set of recorded photons 702(p) can be equal to $C_{p\_Partial}$. In other words, the set of recorded photons 702(p) can have a recorded photon 702(p)(1) to a recorded photon 702(p)($C_{p\_Partial}$).

As also shown, FIG. 7 depicts a non-limiting example embodiment of the reduced-photon-count sinogram 204(1), after application of photon-wise binomial selection by the split component 116.

In various aspects, as shown, the set of pixels 408 of the reduced-photon-count sinogram 204(1) can be no longer empty. For example, the pixel 408(1) can have a pixel value of $C_{1\_Remainder}$, for any suitable positive integer $C_{1\_Remainder}$ where $C_{1\_Remainder} + C_{1\_Partial} = C_{1\_Total}$ In other words, the pixel 408(1) can be considered as containing or otherwise representing a set of recorded photons 704(1), where the cardinality of the set of recorded photons 704(1) can be equal to $C_{1\_Remainder}$. That is, the set of recorded photons 704(1) can have a recorded photon 704(1)(1) to a recorded photon 704(1)($C_{1\_Remainder}$).

As another example, the pixel 408(p) can have a pixel value of $C_{p\_Remainder}$, for any suitable positive integer $C_{p\_Remainder}$ where $C_{p\_Remainder} + C_{p\_Partial} = C_{p\_Total}$, again hence the term "reduced-photon-count." That is, the pixel 408(p) can be considered as containing or otherwise representing a set of recorded photons 704(p), where the cardinality of the set of recorded photons 704(p) can be equal to $C_{p\_Remainder}$. In other words, the set of recorded photons 704(p) can have a recorded photon 704(p)(1) to a recorded photon 704(p)($C_{p\_Remainder}$).

Note that $C_{1\_Remainder} + C_{1\_Partial} = C_{1\_Total}$, since application of photon-wise binomial selection can cause any of the set of recorded photons 404(1) that are not allocated or assigned to the pixel 406(1) to instead be allocated or assigned to the pixel 408(1).

Likewise, note that $C_{p\_Remainder} + C_{p\_Partial} = C_{p\_Total}$, since application of photon-wise binomial selection can cause any of the set of recorded photons 404(p) that are not allocated or assigned to the pixel 406(p) to instead be allocated or assigned to the pixel 408(p).

Accordingly, the reduced-photon-count sinogram 202(1) and the reduced-photon-count sinogram 204(1) can be considered as being complementary to each other, such that the pixel-wise sum of the reduced-photon-count sinogram 202(1) and the reduced-photon-count sinogram 204(1) can be equal to the sinogram 108(1). For at least this reason, the application of photon-wise binomial selection to the sinogram 108(1) by the split component 116 can be considered as splitting the sinogram 108(1) into the reduced-photon-count sinogram 202(1) and the reduced-photon-count sinogram 204(1).

Moreover, note that application of photon-wise binomial selection can cause $$\frac{C_{1\_Partial}}{C_{1\_Total}} \sim d \text{ and } \frac{C_{1\_Remainder}}{C_{1\_Total}} \sim (1-d).$$

Furthermore, note that application of photon-wise binomial selection can cause $$\frac{C_{p\_Partial}}{C_{p\_Total}} \sim d \text{ and } \frac{C_{p\_Remainder}}{C_{p\_Total}} \sim (1-d).$$

Accordingly, if the sinogram 108(1) is captured by the PCD-CT scanner 106 at a full radiation dosage level, then a dosage level of the reduced-photon-count sinogram 202(1) can be considered as being approximately d, and a dosage level of the reduced-photon-count sinogram 204(1) can be considered as being approximately (1-d). On the other hand, if the sinogram 108(1) is captured by the PCD-CT scanner 106 at a radiation dosage level of L for any suitable real number L where 0<L<1, then a dosage level of the reduced-photon-count sinogram 202(1) can be considered as being approximately d*L, and a dosage level of the reduced-photon-count sinogram 204(1) can be considered as being approximately (1-d)*L.

In any case, the split component 116 can perform photon-wise binomial selection for each of the set of sinograms 108, thereby splitting the photons recorded in the set of sinograms 108 between the set of reduced-photon-count sinograms 202 and the set of reduced-photon-count sinograms 204 (e.g., the split component 116 can perform photon-wise binomial selection on the sinogram 108(n) so as to generate the reduced-photon-count sinogram 202(n) and the reduced-photon-count sinogram 204(n)).

Although the herein disclosure mainly describes various embodiments of the split component 116 as assigning or allocating photons one-by-one (e.g., via a series of Bernoulli trials), this is a mere non-limiting example. In various cases, the split component 116 can perform photon-wise binomial selection on more than one photon at a time (e.g., rather than probabilistically assigning a single photon of the pixel 402(1) at a time to the pixel 406(1) with probability d or instead to the pixel 408(1) with probability 1-d, the split component 116 can probabilistically assign more than one photon of the pixel 402(1) at a time to the pixel 406(1) with probability d or instead to the pixel 408(1) with probability 1-d). In some cases, the more than one photon at a time can be the total number of recorded photons in each pixel. In various other cases, the split component 116 can perform photon-wise binomial selection in batch by sampling binomial distributions (e.g., a binomial distribution associated with the pixel 402(1) can be defined by the photon-count ($C_{1\_Total}$) of the pixel 402(1) and by the threshold probability d; the split component 116 can probabilistically determine how many of the recorded photons of the pixel 402(1) are to be assigned to the pixel 406(1) by sampling such binomial distribution; and the split component 116 can assign to the pixel 408(1) any recorded photons of the pixel 402(1) that remain after such sampling).

Figure 8:
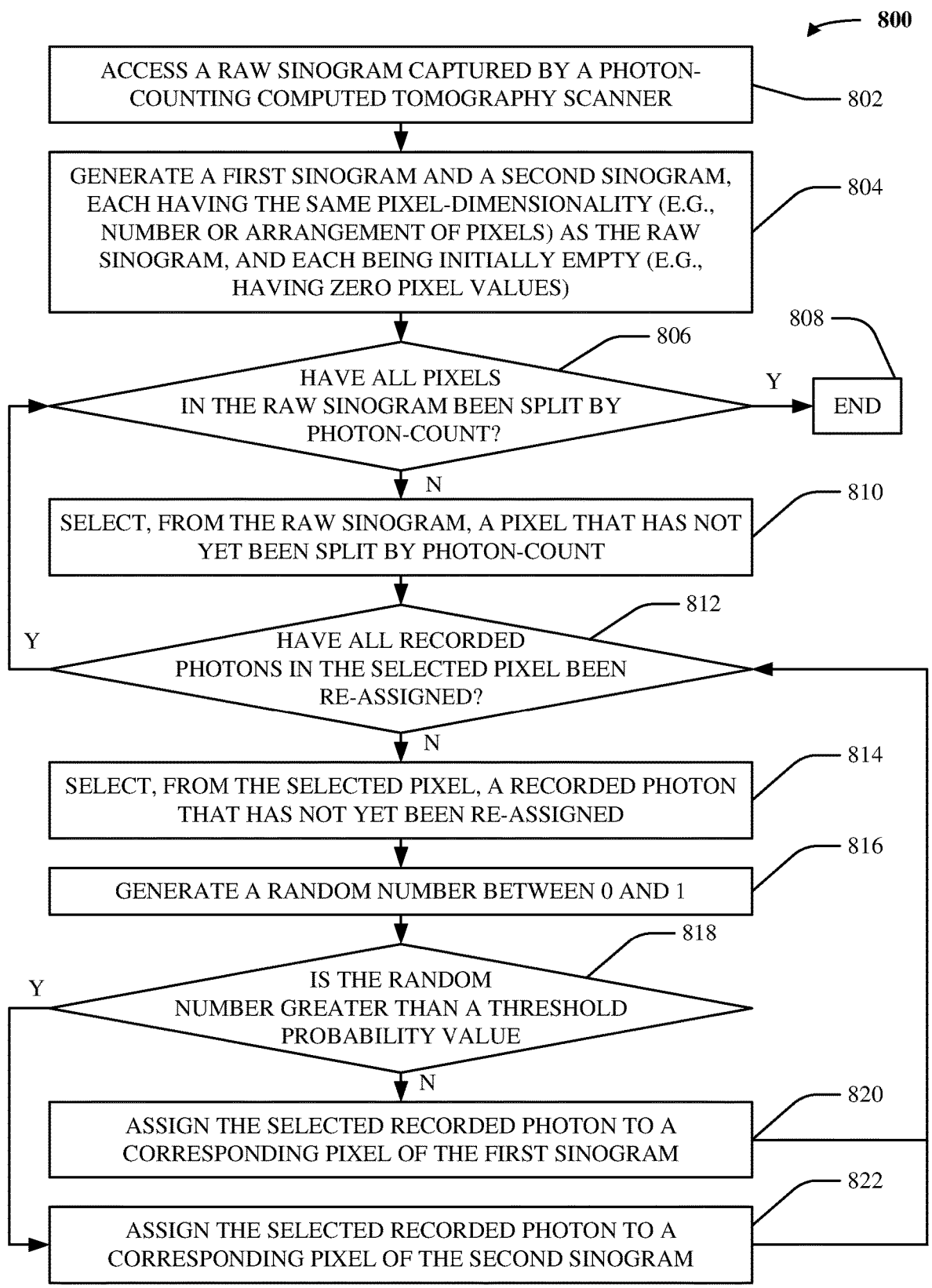
FIG. 8 illustrates a flow diagram of an example, non-limiting computer-implemented method that facilitates photon-count splitting of a raw sinogram in accordance with one or more embodiments described herein.

FIG. 8 illustrates a flow diagram of an example, non-limiting computer-implemented method 800 that can facilitate photon-count splitting of a raw sinogram in accordance with one or more embodiments described herein. In various cases, the denoising training system 102 can facilitate the computer-implemented method 800.

In various embodiments, act 802 can include accessing, by a device (e.g., via 114) operatively coupled to a processor (e.g., 110), a raw sinogram (e.g., 108(1)) captured by a photon-counting computed tomography scanner (e.g., 106).

In various aspects, act 804 can include generating, by the device (e.g., via 116), a first sinogram (e.g., 202(1)) and a second sinogram (e.g., 204(1)), each having the same pixel-dimensionality (e.g., the same number or arrangement of pixels) as the raw sinogram, and each being initially empty (e.g., each having pixel values of zero).

In various instances, act 806 can include determining, by the device (e.g., via 116), whether all pixels in the raw sinogram have been split by photon-count? If so (e.g., if all pixels in the raw sinogram have already been split by photon-count), then the computer-implemented method 800 can end at act 808. If not (e.g., if at least one pixel in the raw sinogram has not yet been split by photon-count), then the computer-implemented method 800 can proceed to act 810.

In various cases, act 810 can include selecting, by the device (e.g., via 116) and from the raw sinogram, a pixel (e.g., 402(p)) that has not yet been split by photon-count.

In various aspects, act 812 can include determining, by the device (e.g., via 116), whether all recorded photons (e.g., 404(p)) in the selected pixel have been re-assigned yet. If so (e.g., if all recorded photons in the selected pixel have already been reassigned), then the computer-implemented method 800 can proceed back to act 806. If not (e.g., if at least one recorded photon in the selected pixel has not yet been reassigned), then the computer-implemented method 800 can proceed to act 814.

In various instances, act 814 can include selecting, by the device (e.g., via 116) and from the selected pixel, a recorded photon (e.g., 404(p)($C_{p\_Total}$)) that has not yet been re-assigned.

In various cases, act 816 can include generating, by the device (e.g., via 116) a random number between 0 and 1.

In various aspects, act 818 can include determining, by the device (e.g., via 116), whether the random number is greater than a threshold probability value (e.g., d). If not (e.g., if the random number is less than or equal to the threshold probability value, which has a likelihood of occurrence equal to the threshold probability value), then the computer-implemented method 800 can proceed to act 820. If so (e.g., if the random number is greater than the threshold probability value, which has a likelihood of occurrence equal to the complement of the threshold probability value), then the computer-implemented method 800 can proceed to act 822.

In various instances, act 820 can include assigning, by the device (e.g., via 116), the selected recorded photon to a corresponding pixel (e.g., 406(p)) of the first sinogram. The computer-implemented method 800 can then proceed back to act 812.

In various cases, act 822 can include assigning, by the device (e.g., via 116), the selected recorded photon to a corresponding pixel (e.g., 408(p)) of the second sinogram. The computer-implemented method 800 can then proceed back to act 812.

Note that, in various aspects, acts 814, 816, 818, 820, and 822 can collectively be considered as the performance of photon-wise binomial selection.

Figure 9:
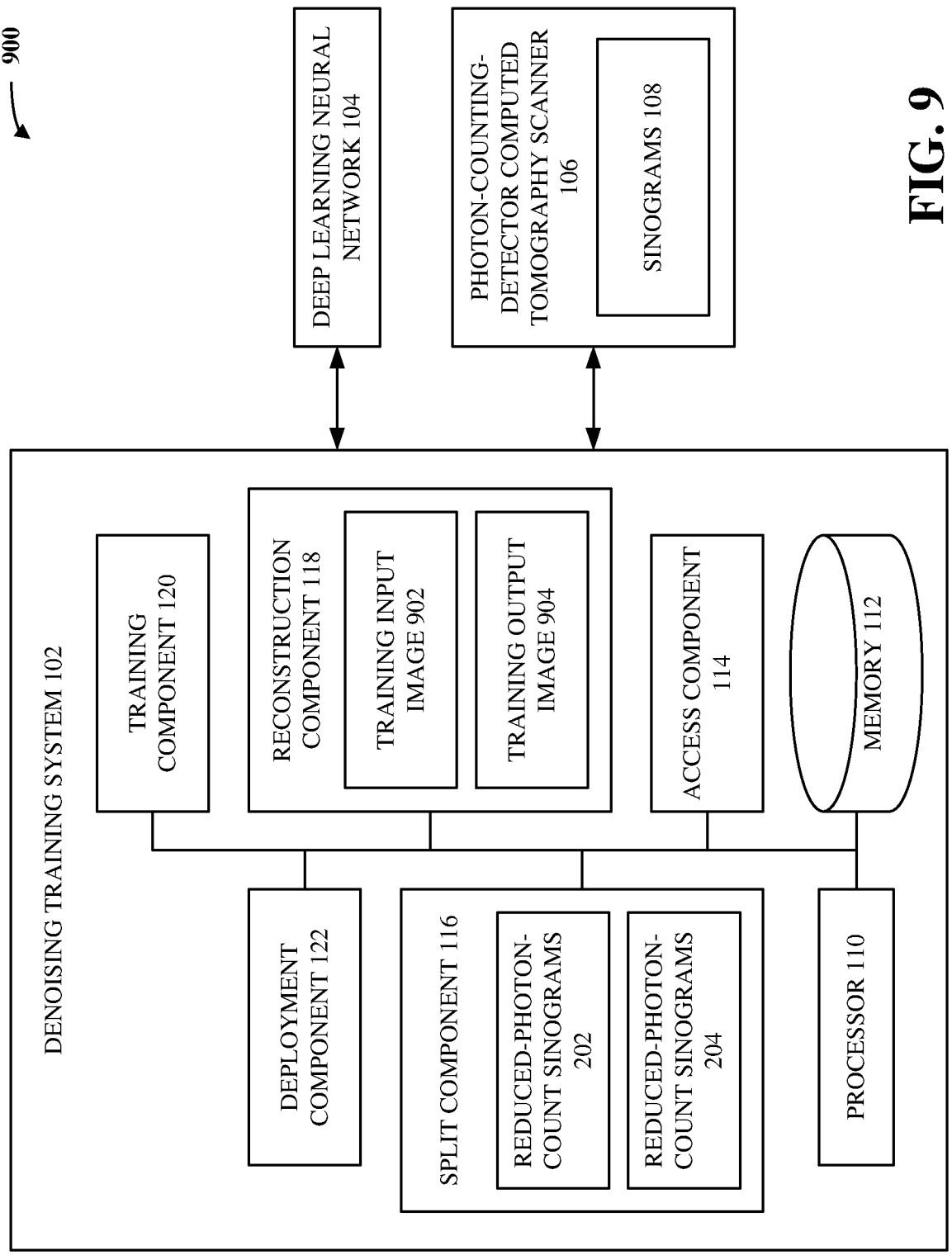
FIG. 9 illustrates a block diagram of an example, non-limiting system including at least one training input image and at least one training output image that facilitates generation of image denoising training data via photon-count splitting in accordance with one or more embodiments described herein.

FIG. 9 illustrates a block diagram of an example, non-limiting system 900 including at least one training input image and at least one training output image that can facilitate generation of image denoising training data via photon-count splitting in accordance with one or more embodiments described herein. As shown, the system 900 can, in some cases, comprise the same components as the system 200, and can further comprise a training input image 902 and a training output image 904.

In various embodiments, the reconstruction component 118 can electronically generate the training input image 902 based on the set of reduced-photon-count sinograms 202. Likewise, the reconstruction component 118 can electronically generate the training output image 904 based on the set of reduced-photon-count sinograms 204. Various non-limiting aspects are described with respect to FIG. 10.

FIG. 10 illustrates an example, non-limiting block diagram 1000 showing how the training input image 902 and the training output image 904 can be generated based on the set of reduced-photon-count sinograms 202 and the set of reduced-photon-count sinograms 204 in accordance with one or more embodiments described herein.

In various aspects, as shown, the reconstruction component 118 can electronically perform any suitable image reconstruction techniques on the set of reduced-photon-count sinograms 202, thereby yielding the training input image 902. As some non-limiting examples, such image reconstruction techniques can include material decomposition or filtered backprojection. In any case, the training input image 902 can be any suitable CT image having any suitable format, size, or dimensionality. For example, in some cases, the training input image 902 can be a two-dimensional pixel array of Hounsfield unit values generated from the set of reduced-photon-count sinograms 202. As another example, in other cases, the training input image 902 can be a three-dimensional voxel array of Hounsfield unit values generated from the set of reduced-photon-count sinograms 202.

In situations where the reconstruction component 118 applies material decomposition, the training input image 902 can comprise a set of material basis input images 1002. In various aspects, the set of material basis input images 1002 can include x material basis images for any suitable positive integer x: a material basis input image 1002(1) to a material basis input image 1002(x). In various instances, the material basis input image 1002(1) can be any suitable CT image having any suitable format or dimensionality (e.g., can be a two-dimensional pixel array of Hounsfield unit values, can be a three-dimensional voxel array of Hounsfield unit values) and exhibiting any suitable material basis (e.g., a calcium material basis). Similarly, in various instances, the material basis input image 1002(x) can be any suitable CT image having the same format or dimensionality as the material basis input image 1002(1) but exhibiting a different or unique material basis (e.g., a water material basis) than the material basis input image 1002(1).

In various aspects, as above, the reconstruction component 118 can electronically perform any suitable image reconstruction techniques on the set of reduced-photon-count sinograms 204, thereby yielding the training output image 904. Again, as some non-limiting examples, such image reconstruction techniques can include material decomposition or filtered backprojection. In any case, the training output image 904 can be any suitable CT image having the same format, size, or dimensionality as the training input image 902. For example, if the training input image 902 is a two-dimensional pixel array of Hounsfield unit values generated from the set of reduced-photon-count sinograms 202, then the training output image 904 can be a two-dimensional pixel array of Hounsfield unit values generated from the set of reduced-photon-count sinograms 204.

As another example, if the training input image 902 is a three-dimensional voxel array of Hounsfield unit values generated from the set of reduced-photon-count sinograms 202, then the training output image 904 can be a three-dimensional voxel array of Hounsfield unit values generated from the set of reduced-photon-count sinograms 204.

Just as above, in situations where the reconstruction component 118 applies material decomposition, the training output image 904 can comprise a set of material basis output images 1004. In various aspects, the set of material basis output images 1004 can have the same cardinality as the set of material basis input images 1002. Accordingly, since the set of material basis input images 1002 can include x material basis images, the set of material basis output images 1004 can likewise include x material basis: a material basis output image 1004(1) to a material basis output image 1004($x$). In various instances, the set of material basis output images 1004 can respectively correspond (e.g., in one-to-one fashion) to the set of material basis input images 1002. For example, the material basis output image 1004(1) can correspond to the material basis input image 1002(1), meaning that the material basis output image 1004(1) and the material basis input image 1002(1) can have the same format or dimensionality as each other and can exhibit the same material basis as each other. Likewise, the material basis output image 1004($x$) can correspond to the material basis input image 1002($x$), meaning that the material basis output image 1004($x$) and the material basis input image 1002($x$) can have the same format or dimensionality as each other and can exhibit the same material basis as each other.

Although FIG. 10 depicts the training input image 902 and the training output image 904 as comprising material basis images (e.g., as being material decomposition images), this is a mere non-limiting example. In various aspects, the training input image 902 and the training output image 904 can be any suitable types of images (e.g., can be virtual monoenergetic images).

Note that, since the set of sinograms 108 can be considered as representing projections of the anatomical structure of the medical patient that was scanned by the PCD-CT scanner 106, both the set of reduced-photon-count sinograms 202 and the set of reduced-photon-count sinograms 204 can also be considered as representing those projections of the anatomical structure of the medical patient. Therefore, both the training input image 902 and the training output image 904 can be considered as visually illustrating or visually depicting the anatomical structure of the medical patient. However, as mentioned above, the probability d can be considered as a proxy for the radiation dosage level of the set of reduced-photon-count sinograms 202, and the probability (1-$d$) can be considered as a proxy for the radiation dosage level of the set of reduced-photon-count sinograms 204. Accordingly, because the training input image 902 can be generated from the set of reduced-photon-count sinograms 202, and because the training output image 904 can be generated from the set of reduced-photon-count sinograms 204, the probability d can be considered as a proxy for the radiation dosage level of the training input image 902, and the probability (1-$d$) can be considered as a proxy for the radiation dosage level of the training output image 904. Accordingly, the training input image 902 and the training output image 904 can be considered as depicting the same anatomical structure of the same medical patient as each other but at distinct dosage levels (e.g., the material basis input image 1002(1) and the material basis output image 1004(1) can be considered as depicting the same anatomical structure of the same medical patient via a same material basis as each other but at distinct dosage levels; the material basis input image 1002($x$) and the material basis output image 1004($x$) can be considered as depicting the same anatomical structure of the same medical patient via a same material basis as each other but at distinct dosage levels).

If the probability d is less than 50% (e.g., if 0<d<0.5), then the probability (1-$d$) can be greater than 50% (e.g., 1>(1-$d$)>0.5). In such case, the radiation dosage level of the training input image 902 can be lesser than the radiation dosage level of the training output image 904. In such case, the training input image 902 can be considered as exhibiting or otherwise having more visual noise than the training output image 904 (e.g., the material basis input image 1002(1) can have more visual noise than the material basis output image 1004(1); the material basis input image 1002($x$) can have more visual noise than the material basis output image 1004($x$)).

If the probability d is equal to 50% (e.g., if 0<d=0.5), then the probability (1-$d$) can also be equal to 50% (e.g., 1>(1-$d$)=0.5). In such case, the radiation dosage level of the training input image 902 can be equal to the radiation dosage level of the training output image 904. In such case, the training input image 902 can be considered as exhibiting or otherwise having a comparable amount of visual noise as the training output image 904 (e.g., the material basis input image 1002(1) can have comparable visual noise as the material basis output image 1004(1); the material basis input image 1002($x$) can have comparable visual noise than the material basis output image 1004($x$)).

If the probability d is greater than 50% (e.g., if 0.5<d<1), then the probability (1-$d$) can be less than 50% (e.g., 0.5>(1-$d$)>0). In such case, the radiation dosage level of the training input image 902 can be greater than the radiation dosage level of the training output image 904. In such case, the training input image 902 can be considered as exhibiting or otherwise having less visual noise than the training output image 904 (e.g., the material basis input image 1002(1) can have less visual noise than the material basis output image 1004(1); the material basis input image 1002($x$) can have less visual noise than the material basis output image 1004($x$)).

In any case (e.g., no matter the particular value of the probability d), whatever noise is present in the training input image 902 can be uncorrelated with (e.g., independent of) whatever noise is present in the training output image 904. Such noise independence can be caused by the application of photon-count splitting via photon-wise binomial selection.

In various embodiments, the training component 120 of the denoising training system 102 can perform supervised training on the deep learning neural network 104, based on the training input image 902 and the training output image 904. More specifically, the training output image 904 can be considered as a ground-truth annotation or target that corresponds to the training input image 902. Various non-limiting aspects are described with respect to FIG. 11.

Figure 11:
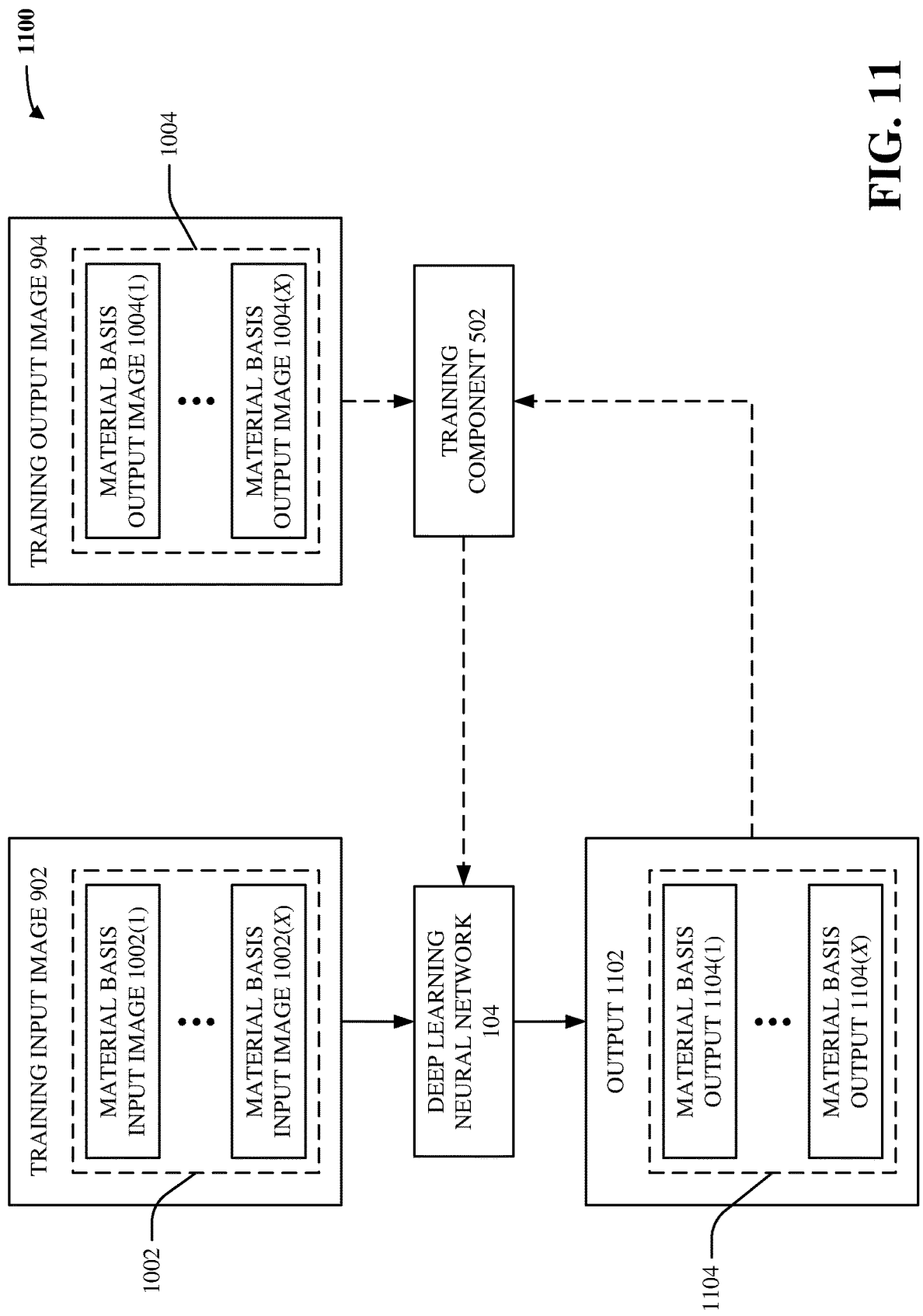
FIG. 11 illustrates an example, non-limiting block diagram showing how a deep learning neural network can be trained in accordance with one or more embodiments described herein.

FIG. 11 illustrates an example, non-limiting block diagram 1100 showing how the deep learning neural network 104 can be trained in accordance with one or more embodiments described herein.

In various aspects, prior to beginning training, the training component 120 can initialize, in any suitable fashion (e.g., random initialization), any trainable internal parameters (e.g., convolutional kernels, weight matrices, bias values) of the deep learning neural network 104.

In various instances, the training component 120 can execute the deep learning neural network 104 on the training input image 902. In various cases, such execution can cause the deep learning neural network 104 to produce an output 1102. More specifically, in some cases, an input layer of the deep learning neural network 104 can receive the training input image 902 (e.g., the set of material basis input images 1002), the training input image 902 (e.g., the set of material basis input images 1002) can complete a forward pass through one or more hidden layers of the deep learning neural network 104, and an output layer of the deep learning neural network 104 can compute the output 1102 based on activations provided by the one or more hidden layers. In some cases, as shown, the output 1102 can include a set of material basis outputs 1104 that respectively correspond to the set of material basis input images 1002. That is, since the set of material basis input images 1002 can have a cardinality of x, the set of material basis outputs 1104 can likewise have a cardinality of x: a material basis output 1104(1) to a material basis output 1104(x).

In various aspects, the output 1102 can be considered as the predicted or inferred result (e.g., the predicted/inferred denoised version) that the deep learning neural network 104 believes should correspond to the training input image 902. In contrast, the training output image 904 can be considered or otherwise treated as the correct, accurate, or ground-truth result (e.g., correct/accurate denoised version) that is deemed to correspond to the training input image 902. In other words, the material basis output 1104(1) can be considered as the predicted or inferred result that the deep learning neural network 104 believes should correspond to the material basis input image 1002(1), whereas the material basis output image 1004(1) can be considered or treated as the correct, accurate, or ground-truth result corresponding to the material basis input image 1002(1). Likewise, the material basis output 1104(x) can be considered as the predicted or inferred result that the deep learning neural network 104 believes should correspond to the material basis input image 1002(x), whereas the material basis output image 1004(x) can be considered or treated as the correct, accurate, or ground-truth result corresponding to the material basis input image 1002(x). Note that, if the deep learning neural network 104 has so far undergone no or little training, then the output 1102 can be highly inaccurate (e.g., the output 1102 can be very different from the training output image 904, the material basis output 1104(1) can be very different from the material basis output image 1004(1), the material basis output 1104(x) can be very different from the material basis output image 1004(x)).

In various aspects, as shown, the training component 120 can compute an error or loss (e.g., MAE, MSE, cross-entropy) between the output 1102 and the training output image 904 (e.g., between the material basis output 1104(1) and the material basis output image 1004(1); between the material basis output 1104(x) and the material basis output image 1004(x)). In various instances, the training component 120 can incrementally update, via backpropagation, the trainable internal parameters of the deep learning neural network 104, based on such computed error or loss.

Note that the above-described training procedure implementable by the training component 120 is a mere non-limiting example involving a training batch size of one. This is for ease of explanation and illustration. In various aspects, the access component 114 can access a plurality of sets of sinograms generated via photon-counting-detector technology, the split component 116 and the reconstruction component 118 can generate a plurality of training input images and a respectively corresponding plurality of training output images based on such plurality of sets of sinograms, such plurality of training input images and such corresponding plurality of training output images can be considered as an entire training dataset, and training component 120 can train the deep learning neural network 104 on such training dataset. In other words, the training component 120 can implement any suitable training batch sizes to train the deep learning neural network 104. Moreover, the training component 120 can implement any suitable error/loss functions or any suitable training termination criteria.

Note that, regardless of d (e.g., for $0<d\leq0.5$ or for $0.5<d<1$), the deep learning neural network 104 can be considered as learning how to denoise inputted CT images, since the training input image 902 and the training output image 904 can have independent noise. That is, even when the training input image 902 has less noise than the training output image 904 (e.g., when $0.5<d<1$), the deep learning neural network 104 can be considered as learning how to denoise, due to the fact that whatever noise is present in the training input image 902 can be independent of (e.g., not correlated with) whatever noise is present in the training output image 904.

In various embodiments, after the deep learning neural network 104 has been trained by the training component 120, the deployment component 122 can electronically deploy the deep learning neural network 104. In other words, whenever a given CT image is encountered for which denoising is desired, the deployment component 122 can electronically execute the deep learning neural network 104 on such given CT image, thereby causing the deep learning neural network 104 to produce a resulting CT image (e.g., an inferred or predicted denoised version of the given CT image). In various cases, the deployment component 122 can electronically transmit the resulting CT image to any suitable computing devices. In various aspects, the deployment component 122 can electronically render the resulting CT image on any suitable computer screen, computer display, computer monitor, or graphical user-interface.

Various non-limiting aspects are further described below.

In the diagnostic energy range, material attenuation coefficients can be decomposed into a linear combination of basis materials, as follows:

$$\mu(E)\Sigma_{i=1}^{M}a_i f_i(E)$$

where $a_i$ is the decomposition coefficient, where $f_i$ is the material attenuation curves of the i-th basis material, and where M denotes the number of basis materials. When there are no K-edge materials, M=2 can be sufficient. Otherwise, K-edge materials can be added as basis materials.

The material decomposition method can be used to estimate the line integral of decomposition coefficients with spectral measurements. For PCDs, the measurements can be formulated as follows:

$$\lambda_i = \int_{bin_i} dE \int_0^{E_{max}} dE \cdot S(E) \exp(-\Sigma_{i=1}^{M} A_i f_i(E)) h(E':E)$$

where $A_i = \int_l a_i \, dl$, where $\lambda_i$ are the photon counts for the i-th energy bin, where S(E) is the source spectrum, and where h(E': E) is the detector response, which models non-ideal response. In various cases, the primary response can be focused on, which can be equivalent to perfect crosstalk correction such that photon count measurements $P_{Fd,i}$ follow a Poisson distribution, where i is the index of energy bins and Fd means full-dose. That is, $$P_{Fd,i} \sim \text{Poisson}(\lambda_i)$$

In various aspects, photon-wise binomial selection can be used to split the full-dose photon counts into two independent low-dose counts that both still follow a Poisson distribution. That is, $$P_{Ld,i}^{(d)} = \text{Binomial}(P_{Fd,i}, d)$$

and $$P_{Ld,i}^{(1-d)} = P_{Fd,i} - L_{Ld,i}^{(d)}$$

where d is the defined dose level (e.g., the threshold probability for photon-wise binomial selection) where 0<d<1. This yields two independent splits $P_{Ld,i}^{(d)}$ and $P_{Ld,i}^{(1-d)}$ at a dose level d and a remaining dose level (1-d), respectively. Note that both $P_{Ld,i}^{(d)}$ and $P_{Ld,i}^{(1-d)}$ are Poisson distributed at their respective doses and have independent noise. In contrast, $P_{Ld,i}^{(d)}$ and $P_{Fd,i}$ have correlated noise (e.g., are not independent).

Figure 12:
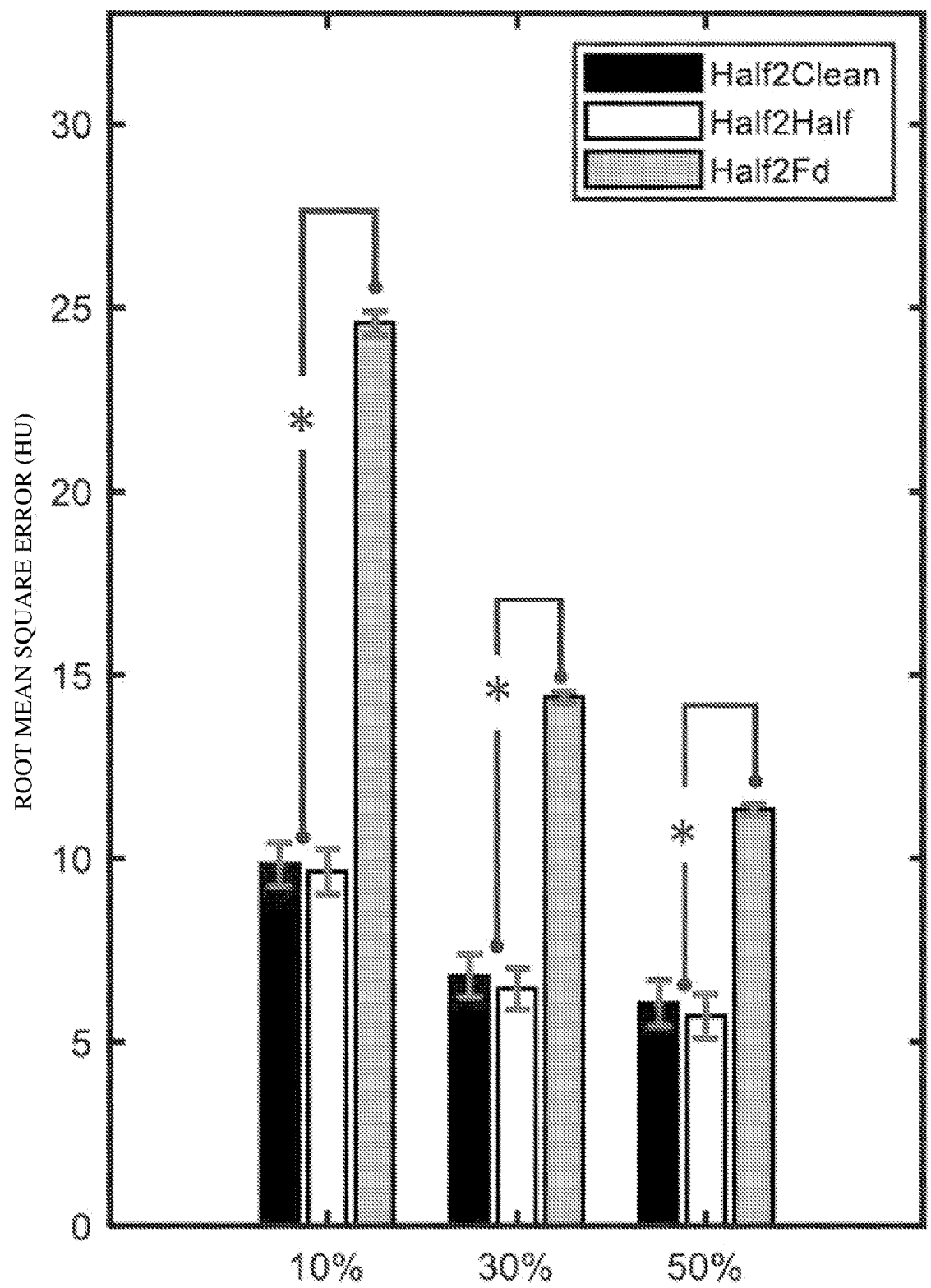
FIGS. 12-13 illustrate example, non-limiting experimental results that demonstrate various benefits of one or more embodiments described herein.
Figure 13:
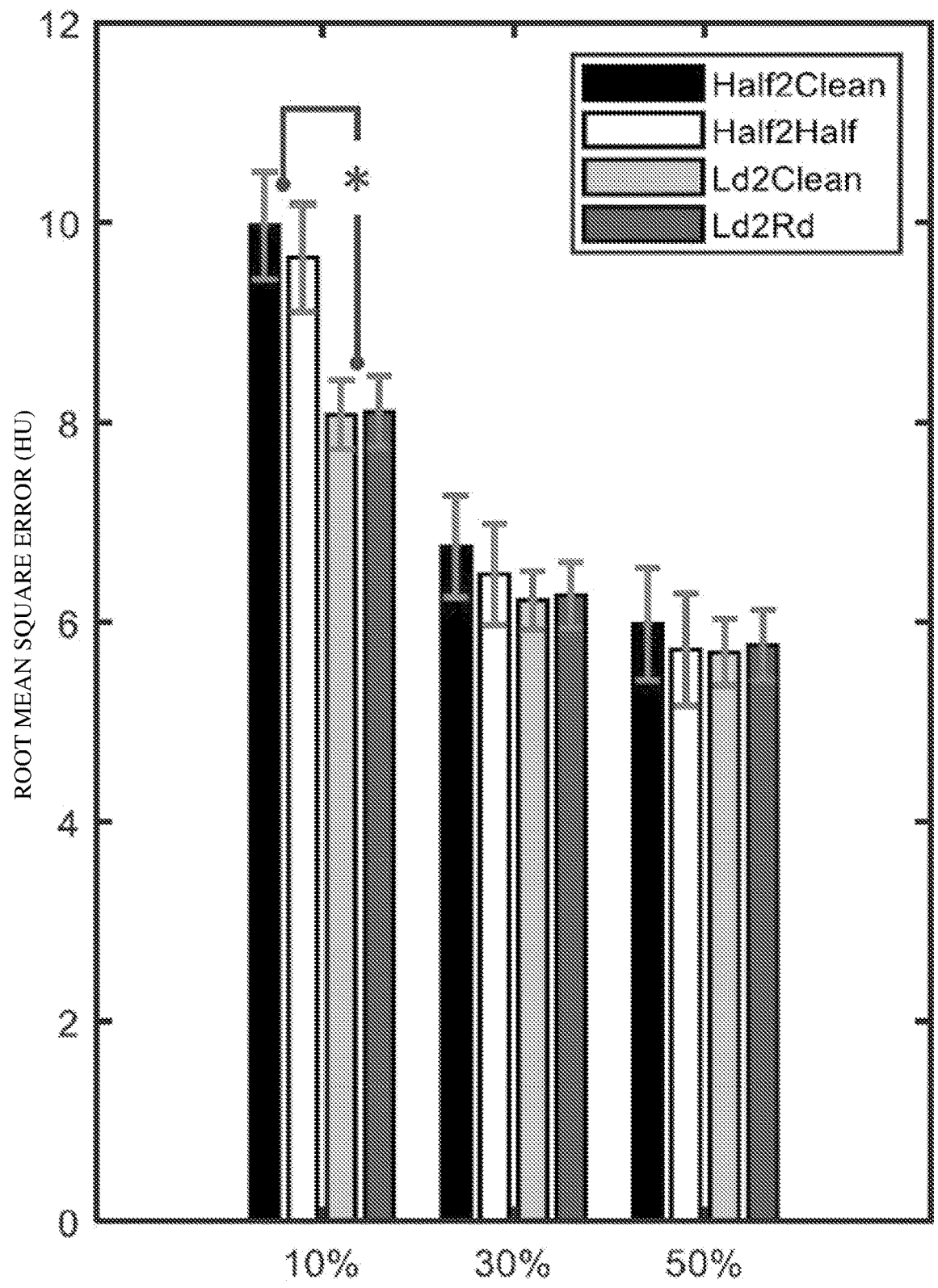

FIGS. 12-13 illustrate example, non-limiting experimental results that demonstrate various benefits of one or more embodiments described herein.

The present inventors performed various experiments. In such experiments, a first deep learning neural network was trained to perform image denoising, using low-dose training inputs (e.g., some captured at 10% dosage, others captured at 30% dosage, still others captured at 50% dosage) and completely clean training outputs. Such training strategy was referred to as Ld2Clean (e.g., "low-dose to clean"). This can be considered as an existing training technique that can achieve theoretically optimal performance.

In such experiments, a second deep learning neural network was trained to perform image denoising, using half-dose training inputs (e.g., captured at 50% dosage) and completely clean training outputs. Such training strategy was referred to as Half2Clean (e.g., "half-dose to clean"). This can be considered as an existing training technique that can achieve theoretically optimal performance (when training with half-dose images).

In such experiments, a third deep learning neural network was trained to perform image denoising, using half-dose training inputs (e.g., simulated at 50% dosage) simulated from full-dose training outputs (e.g., captured at 100% dosage). Such training strategy was referred to as Half2Fd (e.g., "half-dose to full-dose"). This can be considered as an existing training technique (notice the correlated noise between the training inputs and the training outputs).

In such experiments, a fourth deep learning neural network was trained to perform image denoising, using low-dose training inputs and remaining-dose training outputs that were generated via photon-wise binomial selection as described herein (e.g., some inputs had a dosage level d of 10%, meaning their corresponding outputs had a remaining dosage level (1-d) of 90%; other inputs had a dosage level d of 30%, meaning their corresponding outputs had a remaining dosage level (1-d) of 70%; still other inputs had a dosage level d of 50%, meaning their corresponding outputs had a remaining dosage level (1-d) of 50%). Such training strategy was referred to as Ld2Rd (e.g., "low-dose to remaining-dose"). This can be considered as a non-limiting embodiment described herein.

In such experiments, a fifth deep learning neural network was trained to perform image denoising, using half-dose training inputs and half-dose training outputs that were generated via photon-wise binomial selection as described herein (e.g., inputs had a dosage level d of 50%, meaning their corresponding outputs had a remaining dosage level (1-d) of 50%). Such training strategy was referred to as Half2Half (e.g., "half-dose to half-dose"). This can be considered as another non-limiting embodiment described herein.

After training, such five deep learning neural networks were tested/validated, and the results of such tests/validation are shown in FIGS. 12-13.

In particular, FIG. 12 illustrates a bar graph 1200 showing the resulting performances of the second, third, and fifth deep learning neural networks. That is, the bar graph 1200 shows how Half2Clean, Half2Fd, and Half2Half perform relative to each other. Note that the x-axis of the bar graph 1200 can denote the dosage level of test inputs that were fed to the second, third, and fifth deep learning neural networks for validation. Note also that the y-axis of the bar graph 1200 represents root mean square error as measured in Hounsfield units computed for the second, third, and fifth deep learning neural networks based on their test/validation results. As shown, Half2Fd (an existing technique) significantly underperformed Half2Clean (theoretical optimum) at all dosage levels. In contrast, Half2Half (an embodiment described herein) performs comparably (e.g., nearly the same as, without statistically significant difference) as Half2Clean at all dosage levels. These experimental results help to demonstrate various benefits of using photon-count splitting via photon-wise binomial selection to train a deep learning neural network to perform image denoising.

Likewise, FIG. 13 illustrates a bar graph 1300 showing the resulting performances of the first, second, fourth, and fifth deep learning neural networks. That is, the bar graph 1300 shows how Ld2Clean, Half2Clean, Ld2Rd, and Half2Half perform relative to each other. Note that the x-axis of the bar graph 1300 can denote the dosage level of test inputs that were fed to the first, second, fourth, and fifth deep learning neural networks for validation. Note also that the y-axis of the bar graph 1300 represents root mean square error as measured in Hounsfield units computed for the first, second, fourth, and fifth deep learning neural networks based on their test/validation results. As shown, Half2Half (an embodiment described herein) performs comparably (e.g., nearly the same as, without statistically significant difference) as Half2Clean (theoretical optimum when trained on half-dose) at all dosage levels. Similarly, as shown, Ld2Rd (another embodiment described herein) performs comparably (e.g., nearly the same as, without statistically significant difference) as Ld2Clean (theoretical optimum when training on low-dose) at all dosage levels. Again, these experimental results help to demonstrate various benefits of using photon-count splitting via photon-wise binomial selection to train a deep learning neural network to perform image denoising (e.g., the denoising performance associated with using perfectly noiseless ground-truths can be matched, without the trouble associated with obtaining such perfectly noiseless ground-truths). In addition, Ld2Rd and Ld2Clean outperform (by a statistically significant difference) Half2Half and Half2Clean at low test dose levels (e.g., 10% dose), which demonstrates various benefits of training with different low-dose levels.

Figure 14:
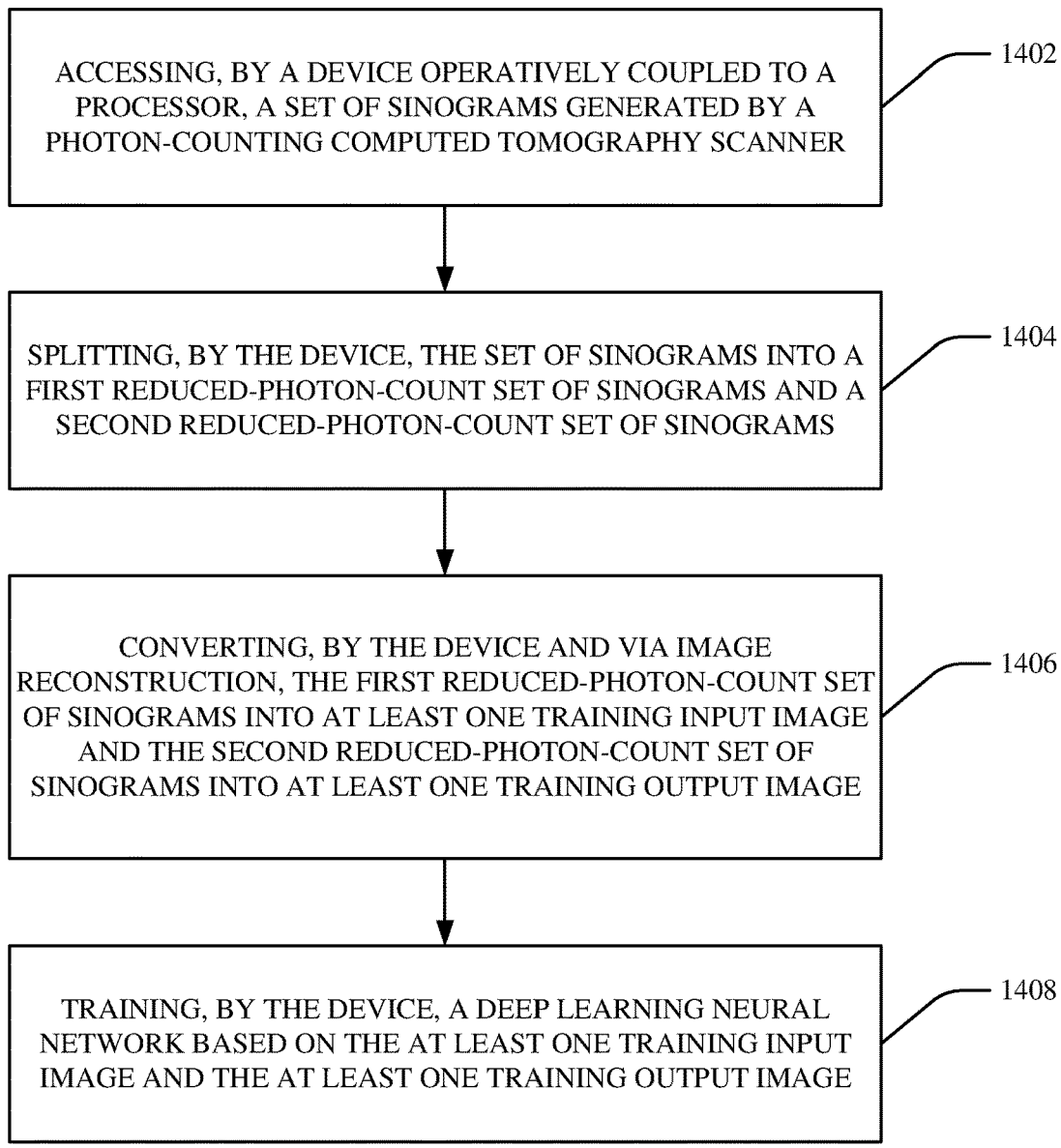
FIG. 14 illustrates a flow diagram of an example, non-limiting computer-implemented method that facilitates generation of image denoising training data via photon-count splitting in accordance with one or more embodiments described herein.

FIG. 14 illustrates a flow diagram of an example, non-limiting computer-implemented method 1400 that can facilitate generation of image denoising training data via photon-count splitting in accordance with one or more embodiments described herein. In various cases, the denoising training system 102 can facilitate the computer-implemented method 1400.

In various embodiments, act 1402 can include accessing, by a device (e.g., via 114) operatively coupled to a processor (e.g., 110), a set of sinograms (e.g., 108) generated by a photon-counting computed tomography scanner (e.g., 106).

In various aspects, act 1404 can include splitting, by the device (e.g., via 116), the set of sinograms into a first reduced-photon-count set of sinograms (e.g., 202) and a second reduced-photon-count set of sinograms (e.g., 204).

In various instances, act 1406 can include converting, by the device (e.g., via 118) and via image reconstruction, the first reduced-photon-count set of sinograms into at least one training input image (e.g., 902) and the second reduced-photon-count set of sinograms into at least one training output image (e.g., 904).

In various cases, act 1408 can include training, by the device (e.g., via 120), a deep learning neural network (e.g., 104) based on the at least one training input image and the at least one training output image.

Although not explicitly shown in FIG. 14, the first reduced-photon-count set and the second reduced-photon-count set can be complementary, such that the first reduced-photon-count set and the second reduced-photon-count set can sum, in pixel-wise fashion, to the set of sinograms (e.g., as discussed with respect to FIG. 7).

Although not explicitly shown in FIG. 14, the splitting the set of sinograms into the first reduced-photon-count set and the second reduced-photon-count set can involve photon-wise binomial selection, wherein the photon-wise binomial selection can probabilistically assign photons recorded in the set of sinograms to the first reduced-photon-count set according to a defined probability value (e.g., d), wherein the photon-wise binomial selection can probabilistically assign photons recorded in the set of sinograms to the second reduced-photon-count set according to a complement of the defined probability value (e.g., 1-d), and wherein the photon-wise binomial selection can cause the training input image and the training output image to be noise independent. In various cases, the defined probability value can be less than fifty percent, such that the at least one training input image is noisier than the at least one training output image. In various other cases, the defined probability value can be equal to fifty percent, such that the at least one training input image is as noisy as the at least one training output image. In still various other cases, the defined probability value can be greater than fifty percent, such that the at least one training input image is less noisy than the at least one training output image.

Although not explicitly shown in FIG. 14, the at least one training input image and the at least one training output image can be material decomposition images or virtual monoenergetic images.

Although not explicitly shown in FIG. 14, the set of sinograms can be collated by photon energy bins.

Although the herein disclosure mainly describes various embodiments of a sinogram as being a two-dimensional array of pixels, this is a mere non-limiting example of ease of illustration and explanation. In various aspects, a sinogram can exhibit any suitable dimensionality (e.g., in some cases, a sinogram can be a three-dimensional voxel array).

Although the herein disclosure mainly describes various embodiments as applying to a deep learning neural network (e.g., 104), this is a mere non-limiting example. In various aspects, the herein-described teachings can be applied to any suitable machine learning models exhibiting any suitable artificial intelligence architectures (e.g., support vector machines, naïve Bayes, linear regression, logistic regression, decision trees, random forest).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)$=confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 15:
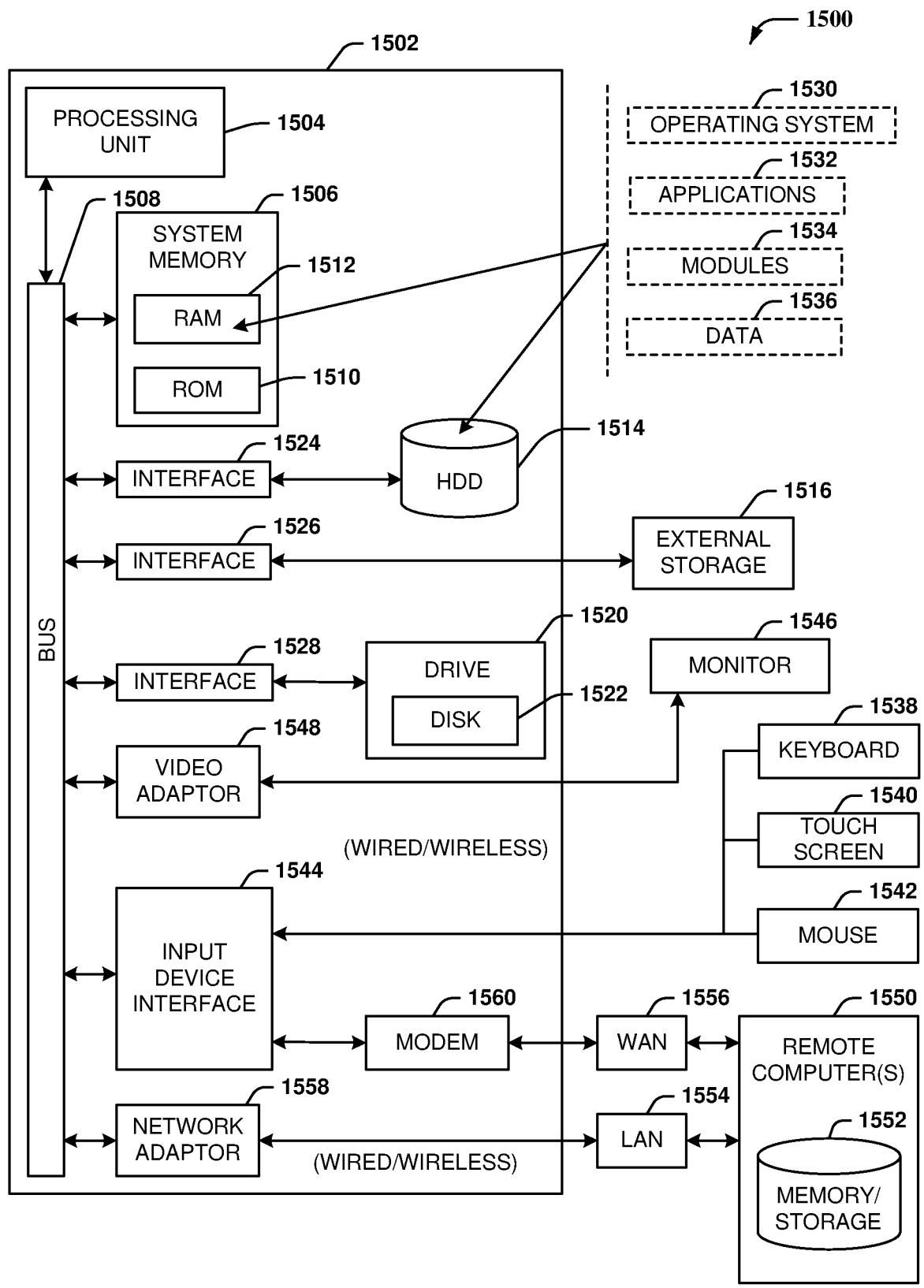
FIG. 15 illustrates a block diagram of an example, non-limiting operating environment in which one or more embodiments described herein can be facilitated.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 16:
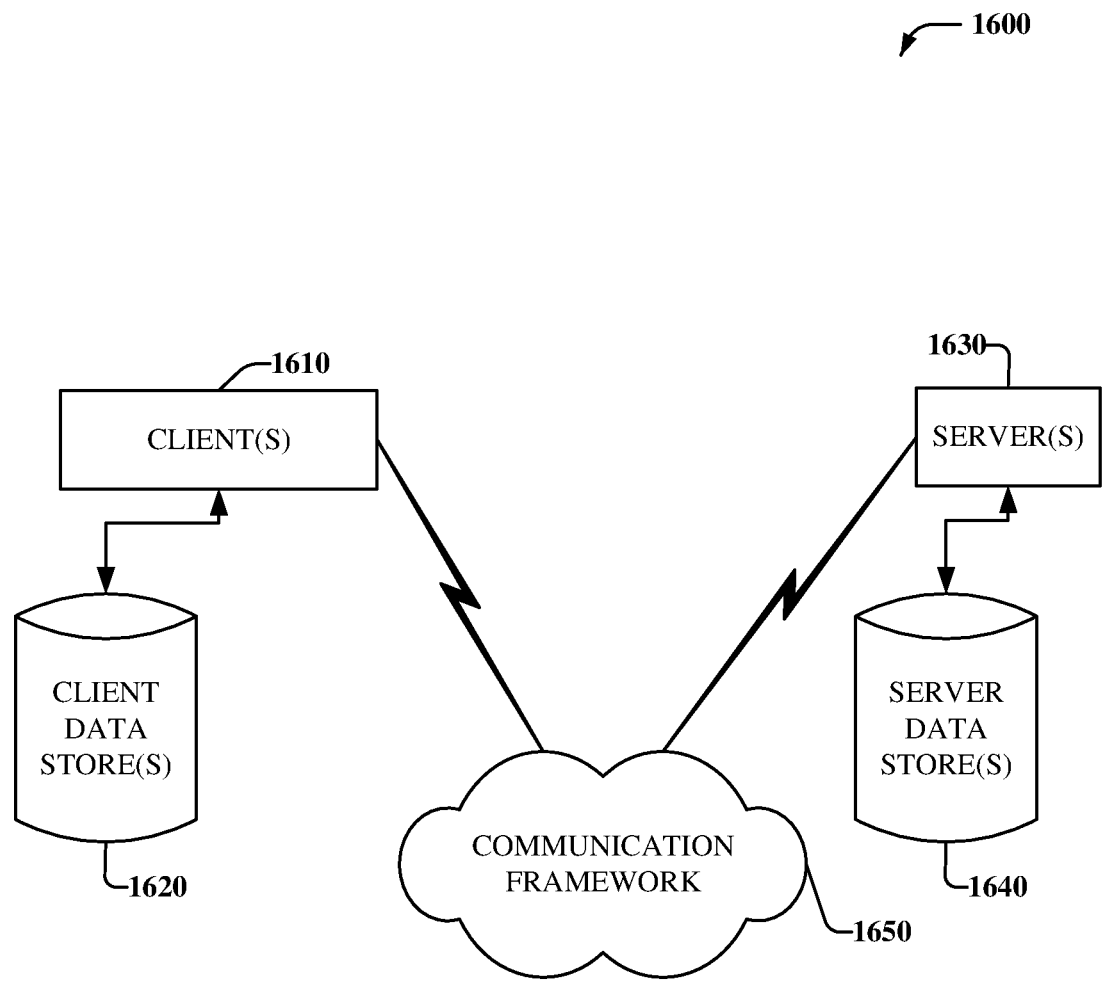
FIG. 16 illustrates an example networking environment operable to execute various implementations described herein.

FIG. 16 is a schematic block diagram of a sample computing environment 1600 with which the disclosed subject matter can interact. The sample computing environment 1600 includes one or more client(s) 1610. The client(s) 1610 can be hardware or software (e.g., threads, processes, computing devices). The sample computing environment 1600 also includes one or more server(s) 1630. The server(s) 1630 can also be hardware or software (e.g., threads, processes, computing devices). The servers 1630 can house threads to perform transformations by employing one or more embodiments as described herein, for example. One possible communication between a client 1610 and a server 1630 can be in the form of a data packet adapted to be transmitted between two or more computer processes. The sample computing environment 1600 includes a communication framework 1650 that can be employed to facilitate communications between the client(s) 1610 and the server(s) 1630. The client(s) 1610 are operably connected to one or more client data store(s) 1620 that can be employed to store information local to the client(s) 1610. Similarly, the server(s) 1630 are operably connected to one or more server data store(s) 1640 that can be employed to store information local to the servers 1630.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory configured to store computer-executable components; and
   a processor that executes at least one of the computer-executable components that:
      trains a deep learning neural network to perform denoising on computed tomography images, wherein the training comprises:
         accessing a set of sinograms generated by at least one photon-counting computed tomography scanner;
         splitting, via photon-wise binomial selection, the set of sinograms into a first reduced-photon-count set of sinograms and a second reduced-photon-count set of sinograms, wherein the photon-wise binomial selection probabilistically assigns photons recorded in the set of sinograms to the first reduced-photon-count set according to a defined probability value, and wherein the photon-wise binomial selection probabilistically assigns photons recorded in the set of sinograms to the second reduced-photon-count set according to a complement of the defined probability value;
         converting, via image reconstruction, the first reduced-photon-count set of sinograms into at least one training input image, and the second reduced-photon-count set of sinograms into at least one training output image, wherein the photon-wise binomial selection causes the at least one training input image and the at least one training output image to be noise independent; and
         training, using the at least one training input image and the at least one training output image, the deep learning neural network to perform the denoising.

2. The system of claim 1, wherein the first reduced-photon-count set and the second reduced-photon-count set are complementary, such that the first reduced-photon-count set and the second reduced-photon-count set sum, in pixel-wise fashion, to the set of sinograms.

3. The system of claim 1, wherein the defined probability value is less than fifty percent, such that the at least one training input image is noisier than the at least one training output image.

4. The system of claim 1, wherein the defined probability value is equal to fifty percent, such that the at least one training input image is as noisy as the at least one training output image.

5. The system of claim 1, wherein the defined probability value is greater than fifty percent, such that the at least one training input image is less noisy than the at least one training output image.

6. The system of claim 1, wherein the at least one training input image and the at least one training output image are material decomposition images or virtual monoenergetic images.

7. The system of claim 1, wherein the set of sinograms are collated by photon energy bins.

8. A computer-implemented method, comprising:
   training, by a system operatively coupled to at least one processor, a deep learning neural network to perform denoising on computed tomography images, wherein the training comprises:
      accessing a set of sinograms generated by at least one photon-counting computed tomography scanner;
      splitting, via photon-wise binomial selection, the set of sinograms into a first reduced-photon-count set of sinograms and a second reduced-photon-count set of sinograms, wherein the photon-wise binomial selection probabilistically assigns photons recorded in the set of sinograms to the first reduced-photon-count set according to a defined probability value, and wherein the photon-wise binomial selection probabilistically assigns photons recorded in the set of sinograms to the second reduced-photon-count set according to a complement of the defined probability value;
      converting, via image reconstruction, the first reduced-photon-count set of sinograms into at least one training input image, and the second reduced-photon-count set of sinograms into at least one training output image, wherein the photon-wise binomial selection causes the at least one training input image and the at least one training output image to be noise independent; and
      training, using the at least one training input image and the at least one training output image, the deep learning neural network to perform the denoising.

9. The computer-implemented method of claim 8, wherein the first reduced-photon-count set and the second reduced-photon-count set are complementary, such that the first reduced-photon-count set and the second reduced-photon-count set sum, in pixel-wise fashion, to the set of sinograms.

10. The computer-implemented method of claim 8, wherein the defined probability value is less than fifty percent, such that the at least one training input image is noisier than the at least one training output image.

11. The computer-implemented method of claim 8, wherein the defined probability value is equal to fifty percent, such that the at least one training input image is as noisy as the at least one training output image.

12. The computer-implemented method of claim 8, wherein the defined probability value is greater than fifty percent, such that the at least one training input image is less noisy than the at least one training output image.

13. The computer-implemented method of claim 8, wherein the at least one training input image and the at least one training output image are material decomposition images or virtual monoenergetic images.

14. The computer-implemented method of claim 8, wherein the set of sinograms are collated by photon energy bins.

15. A computer program product comprising a non-transitory computer-readable memory having program instructions embodied therewith, the program instructions executable by a processor to cause the processor to:
 train a deep learning neural network to perform denoising on computed tomography images, wherein the training comprises:
  accessing a set of sinograms generated by at least one photon-counting computed tomography scanner;
  splitting, via photon-wise binomial selection, the set of sinograms into a first reduced-photon-count set of sinograms and a second reduced-photon-count set of sinograms, wherein the photon-wise binomial selection probabilistically assigns photons recorded in the set of sinograms to the first reduced-photon-count set according to a defined probability value, and wherein the photon-wise binomial selection probabilistically assigns photons recorded in the set of sinograms to the second reduced-photon-count set according to a complement of the defined probability value;
  converting, via image reconstruction, the first reduced-photon-count set of sinograms into at least one training input image, and the second reduced-photon-count set of sinograms into at least one training output image, wherein the photon-wise binomial selection causes the at least one training input image and the at least one training output image to be noise independent; and
 training, using the at least one training input image and the at least one training output image, the deep learning neural network to perform the denoising.

16. The computer program product of claim 15, wherein the first reduced-photon-count set and the second reduced-photon-count set are complementary, such that the first reduced-photon-count set and the second reduced-photon-count set sum, in pixel-wise fashion, to the set of sinograms.

17. The computer program product of claim 15, wherein the defined probability value is less than fifty percent, such that the at least one training input image is noisier than the at least one training output image.

18. The computer program product of claim 15, wherein the defined probability value is equal to fifty percent, such that the at least one training input image is as noisy as the at least one training output image.

19. The computer program product of claim 15, wherein the defined probability value is greater than fifty percent, such that the at least one training input image is less noisy than the at least one training output image.

20. The computer program product of claim 15, wherein the at least one training input image and the at least one training output image are material decomposition images or virtual monoenergetic images.

* * * * *